(12) United States Patent
Zola et al.

(10) Patent No.: US 8,272,052 B2
(45) Date of Patent: Sep. 18, 2012

(54) METHOD AND SYSTEM FOR FILING AND MONITORING ELECTRONIC CLAIM SUBMISSIONS IN MULTI-CLAIMANT LAWSUITS

(75) Inventors: Neil Lawrence Zola, Larchmont, NY (US); Shandarese Garr, Huntington Station, NY (US); David Isaac Ganz, Deer Park, NY (US); Gerard E Hanshe, Levittown, NY (US); John Patrick Lennon, II, East Islip, NY (US)

(73) Assignee: The Garden City Group, Inc., Lake Success, NY (US)

( * ) Notice: Subject to any disclaimer, the term of this patent is extended or adjusted under 35 U.S.C. 154(b) by 759 days.

(21) Appl. No.: 12/354,073

(22) Filed: Jan. 15, 2009

(65) Prior Publication Data

US 2010/0180340 A1 Jul. 15, 2010

(51) Int. Cl.
| | |
|---|---|
| G06F 11/00 | (2006.01) |
| G06F 17/30 | (2006.01) |
| G06Q 40/00 | (2006.01) |
| G06Q 50/00 | (2006.01) |
| H04L 9/32 | (2006.01) |
| G06Q 20/00 | (2006.01) |
| G06F 12/00 | (2006.01) |
| G06F 17/00 | (2006.01) |

(52) U.S. Cl. ............ 726/22; 705/40; 705/310; 705/311; 707/805

(58) Field of Classification Search .................... 726/22; 705/310, 311, 40; 707/101
See application file for complete search history.

(56) References Cited

U.S. PATENT DOCUMENTS

| | | | | |
|---|---|---|---|---|
| 2002/0107792 | A1* | 8/2002 | Anderson | 705/40 |
| 2006/0004823 | A1* | 1/2006 | Simmons | 707/101 |
| 2008/0172239 | A1* | 7/2008 | Henderson et al. | 705/1 |

FOREIGN PATENT DOCUMENTS

JP 2007079903 A * 3/2007

OTHER PUBLICATIONS

Michael S. Vogel; "Unmasking "John Doe" defendants: the case for caution in creating new legal standards"; Apr. 2002; CFP '02: Proceedings of the 12th annual conference on Computers, freedom and privacy; Publisher: ACM; pp. 1-7.*

* cited by examiner

*Primary Examiner* — Eleni Shiferaw
*Assistant Examiner* — Courtney Fields
(74) *Attorney, Agent, or Firm* — Loeb & Loeb LLP

(57) ABSTRACT

The invention relates to systems and methods for filing and monitoring electronic claim submissions in proceedings involving a large number of claimants, such as securities class action lawsuits, estate dissolutions, arbitrations, and bankruptcies. The systems and methods create an easy-to-use and convenient way for institutions and individual claimants to register their claim relief upon judgment or settlement.

36 Claims, 38 Drawing Sheets

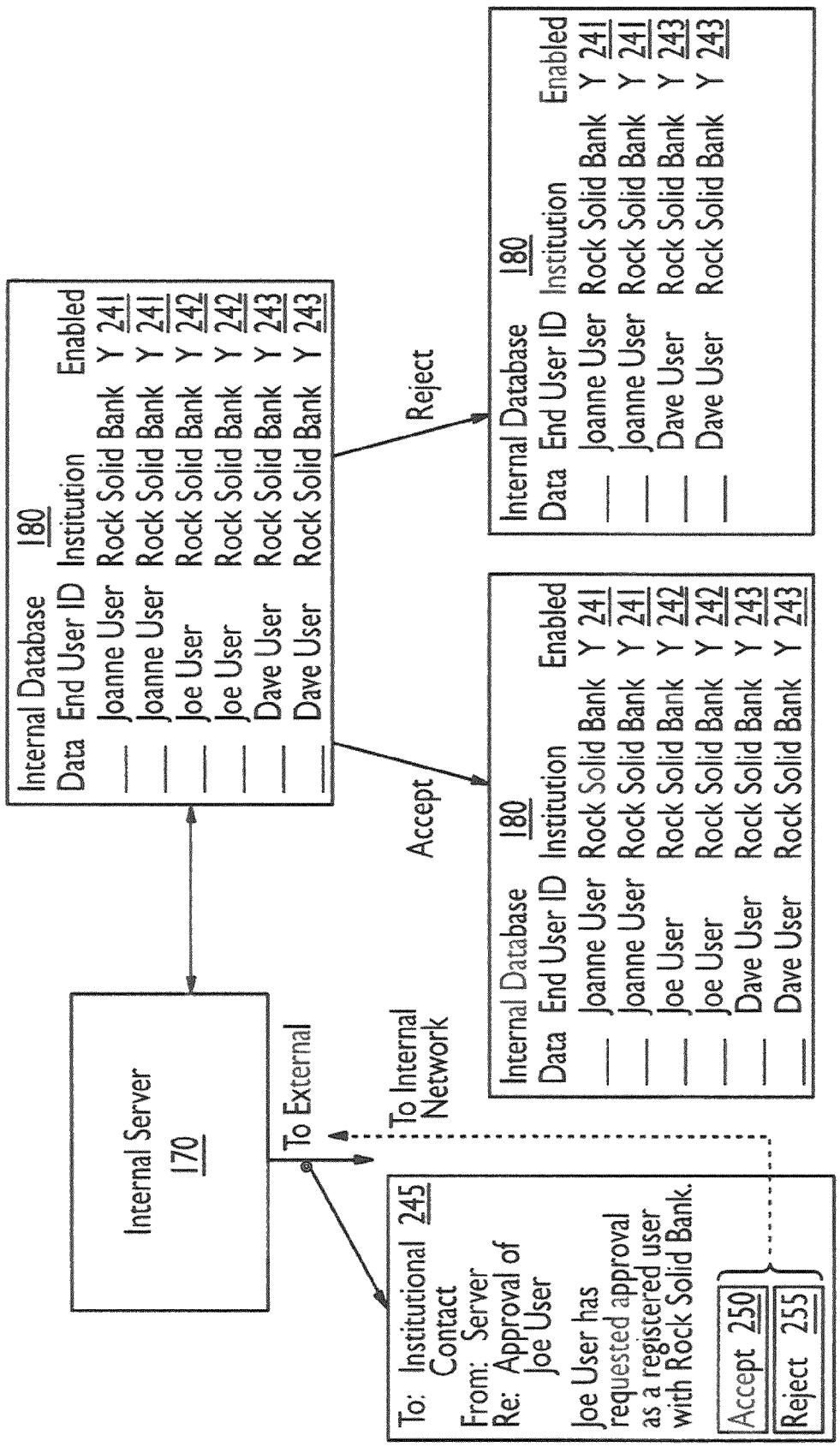

FIG. 4

Provide Formatting Specifications

Please insert the column location of the below fields on your file. Click here to default to GCG template columns.

| Field | Col | Field | Col |
|---|---|---|---|
| *Company Name | A | *Transaction Type | M |
| *Address1 | B | *Trade Date | N |
| *Address2 | C | *Quantity | O |
| *City | D | *Price | P |
| *State | E | *Net Amount | Q |
| *Zip5 | F | *Currency | R |
| *Zip4 | G | Exercise/Assign/Expire Flag | S |
| *Country | H | Exercise/Assign Date | T |
| *Account Name | I | Option/Common Links | U |
| *Account Number | J | **Strike Price of Option | V |
| SSN/Tax ID | K | **Expiration Month & Year Option | W |
| *Security Identifier | L | Additional Info | X |

*REQUIRED ON ALL FILES
**ONLY REQUIRED ON FILES WITH OPTION ACTIVITY

Do you wish to save these column locations for future submissions? Yes ○  No ⊙

Going forward, the column locations will default to required format unless you save your settings.

[Back] [Proceed to Step 5]

FIG. 14

Online Claims

History and Status of Claims

Below is a list of all your submissions and the status of each submission. To view additional details of any submission, please click on the submission number. At this time, you will not be able to access the actual file you submitted to make adjustments or corrections, however, you can simply email us with your updates and/or corrections to you submission. Please do not forget to include your SUBMISSION #.

NOTE: The status of your submissions or claims can change at anytime during the administration process. You will be notified via email with instructions to check you submission on the website and when the status of a submission changes.

Click here to save all submission numbers in a spreadsheet. Click here to print all submissions numbers.

1 to 5 of 50 Records Next 5

| Submission Number | Date Submitted | Submitted for Case | Number of Accounts Specified | Number of Claims Created | File Status | Documentation Status |
|---|---|---|---|---|---|---|
| 1281 | 11/04/2008 | ABC (Aaaa Babbb) | 4 | 0 | In Process | Missing |
| 1283 | 11/04/2008 | ABC (Aaaa Babbb) | 4 | 0 | In Process | Missing |
| 1285 | 11/04/2008 | ABC (Aaaa Babbb) | 6 | 0 | In Process | Missing |
| 1286 | 11/04/2008 | ABC (Aaaa Babbb) | 12 | 0 | In Process | Incomplete |
| 1287 | 11/04/2008 | ABC (Aaaa Babbb) | 6 | 0 | In Process | Missing |

FIG. 16

Fact Sheet [NEW PROJECT]

*Project: [— select — ▼]   *[_____]

Case Overview & Contacts

*Type: [— select — ▼]
*Sub Type: [— select — ▼]
*Phone Code: [_____]          Email
*GCG Office: [— select — ▼]
Project Director: [_____]
Project Manager: [_____]

Case Background

[Add Plaintiff's Counsels]
[Add Defense Counsels]

Court: [_____]
Judge: [_____]
Case Number: [_____]
*Transfer Agent: [— select — ▼]
*Website: [_____]
*PO Box: [_____]
Email Address: [_____]          Publication
Estimated Mailing: [_____]
Estimated Billing: [_____]

Significant Case Dates

*Initial Mailing Date: [_____] 🗓  *Initial Mailing Quantity: [__]
Distribution Date: [_____] 🗓   Proration: [__]

FIG. 18A

| Account x | YouTube - sports reporter... x | Home - manageProjects | + |

Save password | Never for this site

Logout

☐ Confidential

Status: [— select —  ▼]
Case Comments: [                    ]
Distribution List: [ > ]

[ Add New Counsel Firm To List ]

Proposal: [Choose File] No file chosen
*IVR: [Choose File] No file chosen
Live Operator: ☐
*Toll-Free Helpline: [            ] [ > ]
Date and Media: [ > ]
*Notice: [Choose File] No file chosen
*Proof of Claim form: [Choose File] No file chosen Distributable Amount: [            ]

Home - man...   2:12 PM

FIG. 18B

← ⟳ 🏠 ☆ http://www.website.com

Do you want Chrome to save your password?

Add Plaintiff's Counsels
Add Defense Counsels

Court: [          ]
Judge: [          ]
Case Number: [          ]
*Transfer Agent: [— select — ▼]
*Website: [          ]
*PO Box: [          ]
Email Address: [          ]      Publication
Estimated Mailing: [          ]
Estimated Billing: [          ]

Significant Case Dates

*Initial Mailing Date: [          ] 📅   *Initial Mailing Quantity: [  ]
Distribution Date: [          ] 📅   Proration: [  ]
Class Period From: [          ] 📅 To: [          ] 📅
Stipulation: ○Yes ○No   Preliminary Hearing Date: [  ]
Claim Filing Deadline: [          ] 📅   Fairness Hearing Date: [  ]

Other Case Information

Cash Only: ○Yes ○No
Gross Settlement Fund: [          ] GCG holds funds: ☐
Amount Collected: [          ] [Invoices]
Estimated Cost: [          ]
Tax Reporting: [— select —▼]

[Save] [Print]

FIG. 19A

[Home - manageProjects]

[Save password] [Never for this site]

[Add New Counsel Firm To List]

Proposal: [Choose File] No file chosen
*IVR: [Choose File] No file chosen
Live Operator: ☐
*Toll-Free Helpline: [_____] [>]
Date and Media: [>]
*Notice: [Choose File] No file chosen
*Proof of Claim form: [Choose File] No file chosen Distributable Amount: [_____]

Objection Deadline: [_____]
Exclusion Deadline: [_____]
[Add More Dates...]

Eligible Security Identifiers: [>]
[Affidavits]
[Important Documents]

[Home - man...]  2:13 PM

FIG. 19B

FIG. 20A  Tables in QSRV Process (Data Collection)

qsrv_log

| Column Name | Data Type | Length | Allow Nulls |
|---|---|---|---|
| log_idno | int | 4 | |
| logdate | datetime | 8 | ✓ |
| qsrv_server | varchar | 20 | ✓ |
| qry_idno | int | 4 | ✓ |
| logmsg | varchar | 100 | ✓ | qsrv_queue

| Column Name | Data Type | Length | Allow Nulls |
|---|---|---|---|
| qry_idno | int | 4 | |
| qsrv_server | varchar | 20 | ✓ |
| qry_ident | varchar | 8 | ✓ |
| project | varchar | 9 | ✓ |
| db_server | varchar | 20 | ✓ |
| project_db | varchar | 20 | ✓ |
| param_1 | varchar | 50 | ✓ |
| param_2 | varchar | 50 | ✓ |
| create_dt | datetime | 8 | ✓ |
| status | varchar | 1 | ✓ |
| status_dt | datetime | 8 | ✓ |
| qry_return_int | int | 4 | ✓ | qsrv_entry_type

| Column Name | Data Type | Length | Allow Nulls |
|---|---|---|---|
| qry_ident | varchar | 8 | |
| entry_type | varchar | 1 | ✓ | stats_dbsubst

| Column Name | Data Type | Length | Allow Nulls |
|---|---|---|---|
| subst_type | varchar | 8 | ✓ |
| oldval | varchar | 20 | ✓ |
| newval | varchar | 20 | ✓ |

FIG. 20B

Factsheet Data gcgcase_counsel

| Column Name | Data Type | Length | Allow Nulls |
|---|---|---|---|
| FK_project_id | char | 3 | |
| counsel_id | numeric | 5 | ✓ |
| counsel_contact | varchar | 35 | ✓ |
| counsel_ph | varchar | 20 | ✓ |
| counsel_email | varchar | 50 | ✓ |
| counsel_type | char | 10 | ✓ |
| ret_bill | char | 1 | |
| seq_id | int | 4 | ✓ |
| userid | varchar | 20 | ✓ |
| create_dt | datetime | 8 | | gcgcase_factsheet

| Column Name | Data Type | Length | Allow Nulls |
|---|---|---|---|
| fk_project_id | char | 3 | |
| phone_code | varchar | 4 | ✓ |
| fk_casestatus_id | numeric | 5 | ✓ |
| fk_office_id | numeric | 5 | ✓ |
| class_period_start_dt | datetime | 8 | ✓ |
| class_period_end_dt | datetime | 8 | ✓ |
| court_name | varchar | 255 | ✓ |
| judge_name | varchar | 255 | ✓ |
| case_number | varchar | 255 | ✓ |
| transfer_agent | varchar | 50 | ✓ |
| Website | varchar | 255 | ✓ |
| mailing_dt | datetime | 8 | ✓ |
| stipulation_dt | datetime | 8 | ✓ |
| order_dt | datetime | 8 | ✓ |
| objection_deadline_dt | datetime | 8 | ✓ |
| exclusion_deadline_dt | datetime | 8 | ✓ |
| fairness_hearing_dt | datetime | 8 | ✓ |
| filing_deadline_dt | datetime | 8 | ✓ |
| settlement_fund_amt | varchar | 255 | ✓ |

FIG. 20C

| | | 35 |
|---|---|---|
| pobox | varchar | 35 |
| distribution_dt | datetime | 8 |
| net_fund_amt | varchar | 255 |
| net_fund_chk | char | 1 |
| gross_fund_chk | char | 1 |
| project_notes | varchar | 1000 |
| tax_reporting | int | 4 |
| amount_collected | varchar | 255 |
| confidential | char | 1 |
| status_note | varchar | 255 |
| ivr_path | varchar | 150 |
| proposal_path | varchar | 150 |
| estimated_cost | varchar | 255 |
| username | varchar | 20 |
| mod_dt | datetime | 8 |
| initial_mailing_qty | decimal | 9 |
| email_address | varchar | 255 |
| estimated_mailing | numeric | 9 |
| estimated_billing | numeric | 9 |
| proration | varchar | 255 |
| distribuable_amt | varchar | 255 |
| liveoperator_chk | char | 1 |
| stipulation | char | 1 |
| cash_only | char | 1 |
| case_type | int | 4 | fk_casestatus_id gcgcase_status

| Column Name | Data Type | Length | Allow Nulls |
|---|---|---|---|
| pk_casestatus_id | numeric | 5 | |
| case_status | varchar | 100 | ✓ | gcgcase_counsel_lookup

| Column Name | Data Type | Length | Allow Nulls |
|---|---|---|---|
| pk_counsel_id | numeric | 5 | |
| counsel_firm | varchar | 50 | |
| addr_1 | varchar | 40 | |
| addr_2 | varchar | 40 | |
| city | varchar | 30 | |
| state | varchar | 2 | |
| country | varchar | 3 | |
| zip | varchar | 10 | ✓ |

FIG. 20D

Staging Tables on Scheduler (Data Collection)

inv_transfer_wrk_trn_def

| Column Name | Data Type | Length | Allow Nulls |
|---|---|---|---|
| wrk_idno | int | 4 | |
| project_code | varchar | 9 | √ |
| transfer_project_code | varchar | 9 | √ |
| submission_no | int | 4 | √ |
| clm_idno | int | 4 | √ |
| cdt_idno | int | 4 | √ |
| acc_no | char | 15 | √ |
| rej_status | varchar | 50 | √ |
| rej_reason | varchar | 100 | √ |
| security_cd | char | 10 | √ |
| section | varchar | 100 | √ |
| trade_dt | smalldatetime | 4 | √ |
| qty | numeric | 9 | √ |
| price | numeric | 9 | √ |
| net_amt | numeric | 9 | √ |
| msg_code | varchar | 10 | √ |
| create_dt | datetime | 8 | √ |
| Stats_Tran_IdNo | int | 4 | √ |
| collection_Toad_fl | varchar | 1 | √ | inv_transfer_wrk_bplusp

| Column Name | Data Type | Length | Allow Nulls |
|---|---|---|---|
| wrk_idno | int | 4 | |
| project_code | varchar | 9 | √ |
| transfer_project_code | varchar | 9 | √ |
| submission_no | int | 4 | √ |
| clm_idno | int | 4 | √ |
| acc_no | char | 15 | √ |
| rej_status | varchar | 50 | √ |
| rej_reason | varchar | 100 | √ |
| security_cd | char | 10 | √ |
| beg_holding | numeric | 9 | √ |
| buys | numeric | 9 | √ |
| sales | numeric | 9 | √ |
| end_holding | numeric | 9 | √ |
| share_diff | numeric | 9 | √ |
| create_dt | datetime | 8 | √ |
| Stats_Tran_IdNo | int | 4 | √ |
| collection_Toad_fl | varchar | 1 | √ |

FIG. 20E inv_transfer_wrk_rejected

| Column Name | Data Type | Length | Allow Nulls |
|---|---|---|---|
| wrk_idno | int | 4 | |
| project_code | varchar | 9 | ✓ |
| transfer_project_code | varchar | 9 | ✓ |
| submission_no | int | 4 | ✓ |
| clm_indo | int | 4 | ✓ |
| acc_no | char | 15 | ✓ |
| cdt_idno | int | 4 | ✓ |
| rej_status | varchar | 50 | ✓ |
| msg_code | varchar | 10 | ✓ |
| rej_reason | varchar | 1000 | ✓ |
| create_dt | datetime | 8 | ✓ |
| Stats_Tran_IdNo | int | 4 | ✓ |
| collection_load_fl | varchar | 1 | | inv_transfer_wrk_nme

| Column Name | Data Type | Length | Allow Nulls |
|---|---|---|---|
| wrk_idno | int | 4 | |
| project_code | varchar | 9 | ✓ |
| transfer_project_code | varchar | 9 | ✓ |
| submission_no | int | 4 | ✓ |
| clm_idno | int | 4 | ✓ |
| name_addr_1 | varchar | 40 | ✓ |
| name_addr_2 | varchar | 40 | ✓ |
| name_addr_3 | varchar | 40 | ✓ |
| name_addr_4 | varchar | 40 | ✓ |
| name_addr_5 | varchar | 40 | ✓ |
| city | varchar | 30 | ✓ |
| state | char | 2 | ✓ |
| zip_5 | char | 5 | ✓ |
| create_dt | datetime | 8 | ✓ |
| Stats_Tran_IdNo | int | 4 | ✓ |
| collection_load_fl | varchar | 1 | |

FIG. 20F

Initialization Tables on Scheduler (Data Collection)

inv_log

| Column Name | Data Type | Length | Allow Nulls |
|---|---|---|---|
| log_idno | int | 4 | |
| msg_class | varchar | 1 | |
| logdate | datetime | 8 | ✓ |
| logmsg | varchar | 200 | ✓ | inv_daily_load_status

| Column Name | Data Type | Length | Allow Nulls |
|---|---|---|---|
| load_idno | int | 4 | |
| load_date | datetime | 8 | |
| load_status | varchar | 1 | |
| status_date | datetime | 8 | |
| count_projects_total | int | 4 | ✓ |
| count_projects_succe | int | 4 | ✓ |
| count_projects_errors | int | 4 | ✓ |
| count_reruns | int | 4 | ✓ |

FIG. 20G inv_collection_status

| Column Name | Data Type | Length | Allow Nulls |
|---|---|---|---|
| idno | int | 4 | |
| load_indo | int | 4 | |
| project | varchar | 10 | ✓ |
| server | varchar | 20 | ✓ |
| create_dt | datetime | 8 | ✓ |
| last_step_completed | varchar | 4 | ✓ |
| last_step_completed_ | datetime | 8 | ✓ |
| done_status | varchar | 1 | ✓ |
| done_status_dt | datetime | 8 | ✓ |
| exec_status | varchar | 1 | ✓ |
| exec_status_dt | datetime | 8 | ✓ |
| xfer_status | varchar | 1 | ✓ |
| xfer_status_dt | datetime | 8 | ✓ |
| load_status | varchar | 1 | ✓ |
| load_status_dt | datetime | 8 | ✓ |
| updt_status | varchar | 1 | ✓ |
| updt_status_dt | datetime | 8 | ✓ | inv_collection_status_history

| Column Name | Data Type | Length | Allow Nulls |
|---|---|---|---|
| indo | int | 4 | |
| load_indo | int | 4 | |
| project | varchar | 10 | ✓ |
| server | varchar | 20 | ✓ |
| create_dt | datetime | 8 | ✓ |
| last_step_completed | varchar | 4 | ✓ |
| last_step_completed_ | datetime | 8 | ✓ |
| done_status | varchar | 1 | ✓ |
| done_status_dt | datetime | 8 | ✓ |
| exec_status | varchar | 1 | ✓ |
| exec_status_dt | datetime | 8 | ✓ |
| xfer_status | varchar | 1 | ✓ |
| xfer_status_dt | datetime | 8 | ✓ |
| load_status | varchar | 1 | ✓ |
| load_status_dt | datetime | 8 | ✓ |
| updt_status | varchar | 1 | ✓ |
| updt_status_dt | datetime | 8 | ✓ |

FIG. 20H

Transfer (Final) Tables on Scheduler (Data Collection)

Transfer_bplusp

| Column Name | Data Type | Length | Allow Nulls |
|---|---|---|---|
| project_code | varchar | 9 | ✓ |
| submission_no | int | 4 | ✓ |
| cim_idno | int | 4 | ✓ |
| acc_no | char | 15 | ✓ |
| rej_status | varchar | 50 | ✓ |
| rej_reason | varchar | 100 | ✓ |
| security_cd | char | 10 | ✓ |
| beg_holding | numeric | 9 | ✓ |
| buys | numeric | 9 | ✓ |
| sales | numeric | 9 | ✓ |
| end_holding | numeric | 9 | ✓ |
| share_diff | datetime | 8 | ✓ |
| create_dt | int | 4 | ✓ |
| Stats_tran_IdNo | varchar | 1 | ✓ |
| collection_load_fl | int | 4 | ✓ |
| run_Idno | | | |

Trans_nme

| Column Name | Data Type | Length | Allow Nulls |
|---|---|---|---|
| project_code | varchar | 9 | ✓ |
| submission_no | int | 4 | ✓ |
| cim_idno | int | 4 | ✓ |
| name_addr_1 | varchar | 40 | ✓ |
| name_addr_2 | varchar | 40 | ✓ |
| name_addr_3 | varchar | 40 | ✓ |
| name_addr_4 | varchar | 40 | ✓ |
| name_addr_5 | varchar | 40 | ✓ |
| city | varchar | 30 | ✓ |
| state | char | 2 | ✓ |
| zip_5 | char | 5 | ✓ |
| create_dt | datetime | 8 | ✓ |
| Stats_Tran_IdNo | int | 4 | ✓ |
| collection_load_fl | varchar | 1 | ✓ |
| run_idno | int | 4 | ✓ |

FIG. 20I

Transfer_trn_def

| Column Name | Data Type | Length | Allow Nulls |
|---|---|---|---|
| project_code | varchar | 9 | ✓ |
| submission_no | int | 4 | ✓ |
| clm_idno | int | 4 | ✓ |
| cdt_idno | int | 4 | ✓ |
| acc_no | char | 15 | ✓ |
| rej_status | varchar | 50 | ✓ |
| rej_reason | varchar | 100 | ✓ |
| security_cd | char | 10 | ✓ |
| section_cd | varchar | 100 | ✓ |
| trade_dt | smalldatetime | 4 | ✓ |
| qty | numeric | 9 | ✓ |
| price | numeric | 9 | ✓ |
| net_amt | numeric | 9 | ✓ |
| msg_code | varchar | 10 | ✓ |
| create_dt | datetime | 8 | ✓ |
| Stats_tran_IdNo | int | 4 | ✓ |
| collection_load_fl | varchar | 1 | ✓ |
| run_idno | int | 4 | ✓ |

Transfer_rejected

| Column Name | Data Type | Length | Allow Nulls |
|---|---|---|---|
| project_code | varchar | 9 | ✓ |
| submission_no | int | 4 | ✓ |
| clm_indo | int | 4 | ✓ |
| acc_no | char | 15 | ✓ |
| cdt_idno | int | 4 | ✓ |
| rej_status | varchar | 50 | ✓ |
| msg_code | varchar | 10 | ✓ |
| rej_reason | varchar | 1000 | ✓ |
| create_dt | datetime | 8 | ✓ |
| Stats_Tran_IdNo | int | 4 | ✓ |
| collection_load_fl | varchar | 1 | ✓ |
| run_idno | int | 4 | ✓ |

FIG. 20J

Tables used in Web Portal

| tbl_gcg_column_mappings | | | |
|---|---|---|---|
| Column Name | Data Type | Length | Allow Nulls |
| mapping_id | int | 4 | |
| company_name | char | 2 | ✓ |
| address1 | char | 2 | ✓ |
| address2 | char | 2 | ✓ |
| city | char | 2 | ✓ |
| state | char | 2 | ✓ |
| zip5 | char | 2 | ✓ |
| zip4 | char | 2 | ✓ |
| country | char | 2 | ✓ |
| account_name | char | 2 | ✓ |
| account_number | char | 2 | ✓ |
| ssn | char | 2 | ✓ |
| security_identifier | char | 2 | ✓ |

| country | | | |
|---|---|---|---|
| Column Name | Data Type | Length | Allow Nulls |
| code | char | 3 | |
| name | char | 30 | |

FIG. 20K project_dev

| Column Name | Data Type | Length | Allow Nulls |
|---|---|---|---|
| pk_proj_id | int | 4 | |
| gcg_code | varchar | 9 | |
| active_fl | char | 1 | |
| osb_code | char | 4 | |
| destination | char | 30 | |
| server | char | 20 | |
| bank_proj | char | 1 | ✓ |
| stat_fl | char | 1 | ✓ |
| billing_type | char | 1 | ✓ |
| sp_version_number | varchar | 11 | ✓ |
| laod_to_date_wareho | char | 1 | ✓ |
| Project_name | varchar | 80 | ✓ |
| department | varchar | 40 | ✓ |
| manager_id | varchar | 16 | ✓ |
| director_id | varchar | 16 | ✓ |

| Column Name | Data Type | Length | Allow Nulls |
|---|---|---|---|
| transaction_type | char | 2 | ✓ |
| trade_date | char | 2 | ✓ |
| quantity | char | 2 | ✓ |
| price | char | 2 | ✓ |
| net_amount | char | 2 | ✓ |
| currency | char | 2 | ✓ |
| exercise_assign_expir | char | 2 | ✓ |
| exercise_assign_expir | char | 2 | ✓ |
| option_cs_links | char | 2 | ✓ |
| strike_price_of_option | char | 2 | ✓ |
| expiration_month_yea | char | 2 | ✓ |
| additional_info | char | 2 | ✓ |
| create_id | int | 4 | ✓ |
| create_dt | datetime | 8 | ✓ |
| mod_dt | datetime | 8 | ✓ |
| project_id | char | 3 | ✓ |
| inst_idno | numeric | 9 | ✓ |
| type | varchar | 10 | ✓ |

SEQ

| Column Name | Data Type | Length | Allow Nulls |
|---|---|---|---|
| seq_id | int | 4 | |
| seq_desc | char | 30 | |

FIG. 20L

Tables used in Web Portal institution_profile

| | Column Name | Data Type | Length | Allow Nulls |
|---|---|---|---|---|
| 🔑 | inst_idno | int | 4 | |
| | inst_name | varchar | 100 | |
| | inst_type_id | int | 4 | |
| | addr_1 | varchar | 40 | ✓ |
| | addr_2 | varchar | 40 | ✓ |
| | addr_3 | varchar | 40 | ✓ |
| | addr_4 | varchar | 40 | ✓ |
| | city | varchar | 30 | |
| | state | varchar | 40 | ✓ |
| | country | varchar | 3 | |
| | zip | varchar | 10 | |
| | group_email | varchar | 255 | ✓ |
| | ph_main | varchar | 20 | |
| | fax_main | varchar | 20 | ✓ |
| | fl_recv_int_mailing | char | 1 | |

FK_institution_pr institution_type

| | Column Name | Data Type | Length | Allow Nulls |
|---|---|---|---|---|
| 🔑 | inst_type_id | int | 4 | |
| | inst_type | varchar | 30 | |

FIG. 20N

| case_sub_type | int | 4 | ✓ |
|---|---|---|---|
| notice_path | varchar | 255 | ✓ |

METHOD AND SYSTEM FOR FILING AND MONITORING ELECTRONIC CLAIM SUBMISSIONS IN MULTI-CLAIMANT LAWSUITS

FIELD OF THE INVENTION

The invention relates to systems and methods for filing and monitoring electronic claim submissions in proceedings involving a large number of claimants, such as securities class action lawsuits, estate dissolutions, arbitrations, and bankruptcies. The systems and methods create an easy-to-use and convenient way for institutions and individual claimants to register their claim relief upon judgment, settlement or other resolution. Although the present disclosure has applicability beyond securities fraud class action lawsuits, the present disclosure will describe the use of the systems and methods in the context of a securities fraud class action lawsuit with the understanding that those skilled in the art having the present disclosure before them can apply the teachings of this invention to other contexts.

BACKGROUND OF THE INVENTION

Securities litigations are frequently filed as class action lawsuits, a type of lawsuit where one person files a claim or claims in court on behalf of a large group of similarly situated people and entities (the "class"). The proposed class must consist of a group of individuals or entities that have suffered a common injury or injuries. Typically these cases result from an action, generally a disclosure, by a business or a particular product defect or policy that was publicly disclosed and available to the investing public. Securities fraud or other class action lawsuits can also result from a company failing to disclose detrimental information, that resulted in a change in the price of the company's stock to the detriment of a class of shareholders.

The identity of all of the members of the class of plaintiffs is usually unknown at the beginning of a securities lawsuit. Generally, a complaint is filed by one or more plaintiffs on behalf of the class. In order to indicate that class action status is sought, the phrase "and others similarly situated" can be incorporated into court documents. The number of class members may increase (or decrease) over time as additional plaintiffs are identified or the class definition changes. The class members can be identified during discovery proceedings, or after notices are distributed and responded to. The class definition also may be revised by the court, which might alter the size of the class by excluding or including potential class members.

Upon application by the plaintiffs or the parties collectively, the court will certify a class. Thereafter, the defendant(s) may generate a list of potential claimants. This list can be used to contact the potential class members to provide "notice," i.e., advise them of the pendency or settlement of the action. Notice is then provided to the class by mailing class notices and/or running advertisements in newspapers, via the Internet, on radio or television, or through similar communications outlets.

When a class action lawsuit is decided in court or is settled out of court, each eligible claimant will receive relief according to the judgment or settlement through an administration process. In the past, administration of a securities class action lawsuit has been a cumbersome process, in part because classes are usually very large. These administrations often require claimants to submit through the mail large volumes of forms and documents to submit and support their claims. These submissions may be made via e-mail or regular mail, but in either case, documents and information would need to be scanned and/or inputted into a database system by hand.

The transaction costs associated with processing the tens of thousands of claims, or more, that are received by mail can be significant. Although e-mails are less cumbersome than regular mail and are used in ever growing numbers, receipt of the information through e-mail has presented the same difficulties as receipt through the mail—there has been no uniformity, no way of tracking and no specific method of organization of e-mails or any attachments without significantly increasing transaction costs. With both e-mails and paper files, there has been difficulty in maintaining proper organization of files without the potential of losing or misplacing information relating to claims. Of course, where regular mail is used this cost is further increased. Where e-mails are used, there is the added possibility that malicious code can be imported into a database inadvertently. Even though these e-mails pass through a perimeter firewall and virus protection is used, a significant risk of infection still exists.

The transaction costs arising from the administration frequently are paid from the settlement fund. Therefore, the total distribution in the class action lawsuit, and the amount that each eligible claimant may recover can be significantly diminished by the administration costs associated with this mailing procedure, the costs of other attempts of notifying the class members, and the costs of the claims processing.

Accordingly, there is a need for a simple, easy to use system and method for filing claims relating to a class action lawsuit, validating the claims, tracking the administrative process and communicating the status of the claims processing to claimants, and overseeing disbursement of relief.

BRIEF DESCRIPTION OF THE INVENTION

The invention relates to a system for filing and monitoring electronic claim submissions via a computer server in a multi-claimant proceeding comprising a graphical user interface hosted by the computer server directed to end user terminals across the Internet for displaying information about a multi-claimant proceeding and facilitating inputting of information regarding institutions, end users and claimants and facilitating uploading of files from the end user terminals; a first database operably connected to the graphical user interface; code for associating pointers with files supporting at least one claim residing on the end user terminals; and anti-virus code for scanning the files for malicious code by following the respective pointers allowing each of the files to be scanned by the anti-virus software for malicious code after being uploaded to the computer server.

The invention also relates to a method for filing and monitoring electronic claim submissions via a computer server in a multi-claimant proceeding comprising providing a graphical user interface on the computer server for access by an end user via the Internet; registering an institution on the computer server to create an institutional database record; registering an end user associated with the registered institution on the computer server to create an end user profile; receiving information regarding a claimant via the graphical user interface and storing the information regarding the claimant on a database associated with the computer server; and storing files supporting a claim directly from a registered end user into the database associated with the computer server. The documentation required to prove eligibility of a claimant can vary. It may include, but is not limited to, a proof of claim form, a signature verification document, a data verification document, and an authorization document. Other documents that may be required are stock certificates, proof of purchase, and proof of sales. The potential claimants can be identified by the defendant, provided to the company administering the litigation by brokers, or generated by mailings and advertisements in newspapers, via the Internet, on radio or television, or through similar communications outlets.

Through the robustness of the present method, the invention has application to an institution filing claims in numerous litigations on behalf of its customers, with each litigation having potentially hundreds of claimants being managed by that one institution. In addition, many claimants may have claims based upon multiple transactions. The present systems and methods support the institution's ability to track all of the claims filed on behalf of all of its customers (the claimants), including the underlying transactions, by presenting a graphical user interface that provides streamlined interaction and access to this information to facilitate the record keeping of each institution in regards to its participation in the administration of the resolution of one or more lawsuits.

In an aspect of the invention, the administrator of the resolution of a lawsuit ("administrator"), an institutional contact, and an end user may each have the ability to view and potentially modify information relating to the administration of claims based upon their authority. The rights to both view and modify information are dependent upon their status and authority. Of course, because of the robustness of the method above, an administrator, an institutional contact, and/or an end user can easily navigate between multiple lawsuits, multiple claimants, multiple claims, and multiple transactions, where they may view input, or modify the records in a single session.

In general, the claim process as described herein may comprise six steps. Step 1 provides for users connecting to a graphical user interface, which may be via a website, through a secure SSL channel or HTTPS. End users will input information to a database and may upload files to a web server after being authenticated or validated against an authentication filter. Step 2 provides for invocation of an anti-virus process that runs on the web server to check whether uploaded files are infected with any viruses. If the files are not infected, step 3 provides for the scanned files to be moved to another location on the web-server, after encryption using an open source encryption scheme. If encryption or copying fails at any point for any file, again the process can be terminated. Step 4 provides for persisting to the database all of the related user inputs for a current upload process. This includes saving control totals and file names to the database. Step 5 provides for a transient, or intermediate, web server to keep polling a cluster of intermediate web servers for any new files in the respective folders. If any new files are found, they are pulled onto a path within itself. Subsequently, this transient, or intermediate, web server decrypts the files and copies them to a file server, thereby completing the upload process. Step 6 provides for a communication mechanism that sends an automatic notification of receipt of a claim.

In another aspect of the invention, the end user can log into the system and monitor the claims that the user had previously filed. The end user can check for claim status and deficiencies, and file additional documents as required to prove eligibility of a particular claimant. However, the end user may only review status and file additional documents relating to claims initially filed by that end user. In addition, during the course of the process, the end user may receive communications from system relating to claims filed by that end user.

If the end users are affiliated with an institution, that institution can be registered with the company administering the lawsuit. The institution could name one or more individuals as specific contacts, should any institutional information be required, or to validate the end users. In one aspect of the invention, only the institutional contact can modify the institution's database record. The institution's database record can comprise administrative information from an institution and the people authorized to act upon the institution's behalf, or for those claimants authorizing the institution to act on their behalf. In contrast to a single end user, the institutional contact(s) may review status and file documents, edit the institutional database record, and will receive communications relating to all claimants whose claims were filed by an end user affiliated with that institution. The institutional contact can also either preauthorize an end user or delete an end user if, e.g., that end user is no longer employed by the institution.

In yet another aspect of the invention, the systems and the methods of the invention allow for end users being able to modify their profiles. In one aspect, the end users can be employees of an institution, which was registered with the company administering the lawsuit. Alternatively, an individual user may access the system of the invention after registration and validation and file his or her own claim.

The invention relates to systems and methods of tracking and monitoring the administration of class action lawsuit resolutions, without the need to coordinate significant amounts of paper mail and documentation and/or electronic mail and documentation each of which would require an extreme amount of effort to scan in and manage. In addition, the system of the invention can be accessed immediately upon end user registration, rather than registering and having to wait until a later date to begin entering and filing claims. The only requirement is that the end user, who is filing the claims, must be associated with a previously registered institution. In the case of an individual investor, they would need to register and be validated as an "institution" prior to filing their claim.

In one aspect of the invention, the end user does not need to be validated immediately. Rather, the end user can register and file one or more claims immediately, and without delay, as these types of proceedings often have deadlines that must be met. By validating the end user after the end user has already filed one or more claims, valuable time can be saved, and court-ordered claims deadlines are less likely to be missed because of system requirements.

In one aspect of the invention, all files inputted by the end user may be initially associated with pointers to those files as they sit on the end user's computer. The use of such pointers thus enables the files to be scanned for malicious code after their being uploaded across the Internet to a web server. The documents may first be uploaded via a transient server to a transient database, after which they may be scanned for malicious code. The malicious code scanning can be performed at predetermined intervals to ensure that no malicious code is uploaded from the transient database through a second firewall onto an internal database via an internal server. The secure server and firewall can be located with the company that administers the litigation or can be located at a remote site. The software used to scan the files for malicious code can be updated at regular intervals, as well as when new computer viruses are uncovered.

These and other objects and advantages of the present disclosure will be apparent to those of ordinary skill in the art having the present drawings, specifications, and claims before them. It is intended that all such additional systems, methods, features, and advantages be included within this description, be within the scope of the disclosure, and be protected by the accompanying claims.

BRIEF DESCRIPTION OF THE FIGURES

The invention may be better understood by references to the detailed description when considered in connection with the accompanying drawings. The components in the figures are not necessarily to scale, emphasis instead being placed upon illustrating the principles of the invention. In the figures, like reference numerals designate corresponding parts throughout the different views.

FIGS. 3A-3D illustrate a flow chart depicting the process of filing a claim by an institutional end user and the transmission of messages between the internal server and the internal network, a registered institution and a registered end user, respectively.

FIG. 4 is an illustrative view of a graphical user interface of exemplary institution registration screen.

FIG. 14 is an illustrative view relating to formatting specifications.

FIGS. 16-17 are illustrative views of the history and status of previously filed claims.

FIGS. 18A-18B and 19A-19B are illustrative views depicting how case data is entered into a new database.

DETAILED DESCRIPTION OF THE INVENTION

While the present disclosure may be embodied in many different forms, the drawings and discussions are presented with the understanding that the present disclosure is an exemplification of the principles of one or more inventions and is not intended to limit any one of the inventions to the embodiments illustrated.

Figure 1:
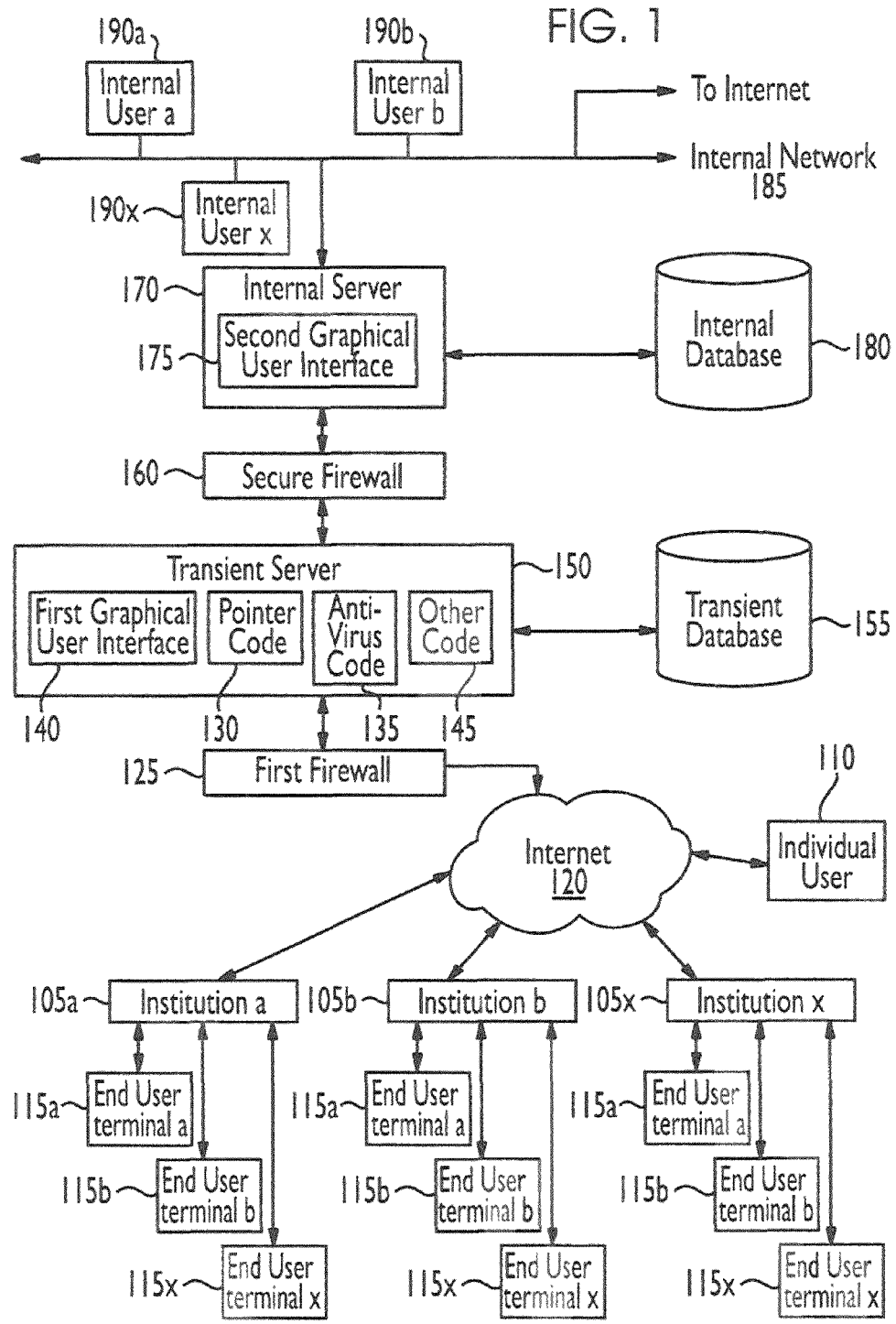
FIG. 1 depicts the novel system of the invention.

FIG. 1 illustrates the novel system 100 of the invention. Specifically, institutions 105a, 105b, 105x and individual users 110 can submit claims and supporting documentation to a company overseeing the administration of a class action lawsuit via the Internet 120 from end user, or client, terminals 115a, 115b, 115x. The Internet 120 as used herein is intended to convey the meaning of a generally available network that is not confined to access by a single specific company. This includes a virtual private network between an end user and an administrator, as well as a connection over a private cable TV IP network.

The end user terminals 115a, 115b, 115x may be general purpose computers that may have, among other elements, a microprocessor (such as from the Intel Corporation or AMD); volatile and non-volatile memory; one or more mass storage devices (i.e., a hard drive); various user input devices, such as a mouse, a keyboard, or a microphone; and a video display system. In one aspect, the general-purpose computer may be controlled by the WINDOWS XP operating system. It is contemplated, however, that the present system would work equally well using a MACINTOSH computer or even another operating system such as a WINDOWS VISTA, UNIX, LINUX or a JAVA based operating system, to name a few.

It is contemplated that each of the end user terminals 115 maybe connected via the Internet to the web server of a multi-claimant administration system. FIG. 1 illustrates the web server as having a transient server 150, an internal server 170, a transient database 155, and an internal database 180. The transient server 150 and the transient database 155 are so named because the files, information documents that are being uploaded are generally only resident for a relatively short and essentially predetermined time. After the files, information, and documentation are ultimately uploaded to the internal database 180, they may be deleted from the transient web server and the transient database. The transient server 150 may include a first graphical user interface 140 that may be operably connected to the transient database 155.

In one aspect of the invention, both the transient 150 and internal 170 web servers and transient and internal databases of the system can be remote web servers and databases. Alternatively, the web servers and databases can be onsite at the system's place of business. The web servers can be one of many commercially available web servers including, but not limited to Tomcat web servers, Apache web servers, Microsoft web servers, Google web servers, lighttpd web servers, and nginx web servers. The web servers can be based on one of many operating systems including, but not limited to UNIX, LINUX, MAC OS, or Windows (XP, VISTA, etc.). It is contemplated, however, that any suitable web server may be used for the present invention.

Figure 2:
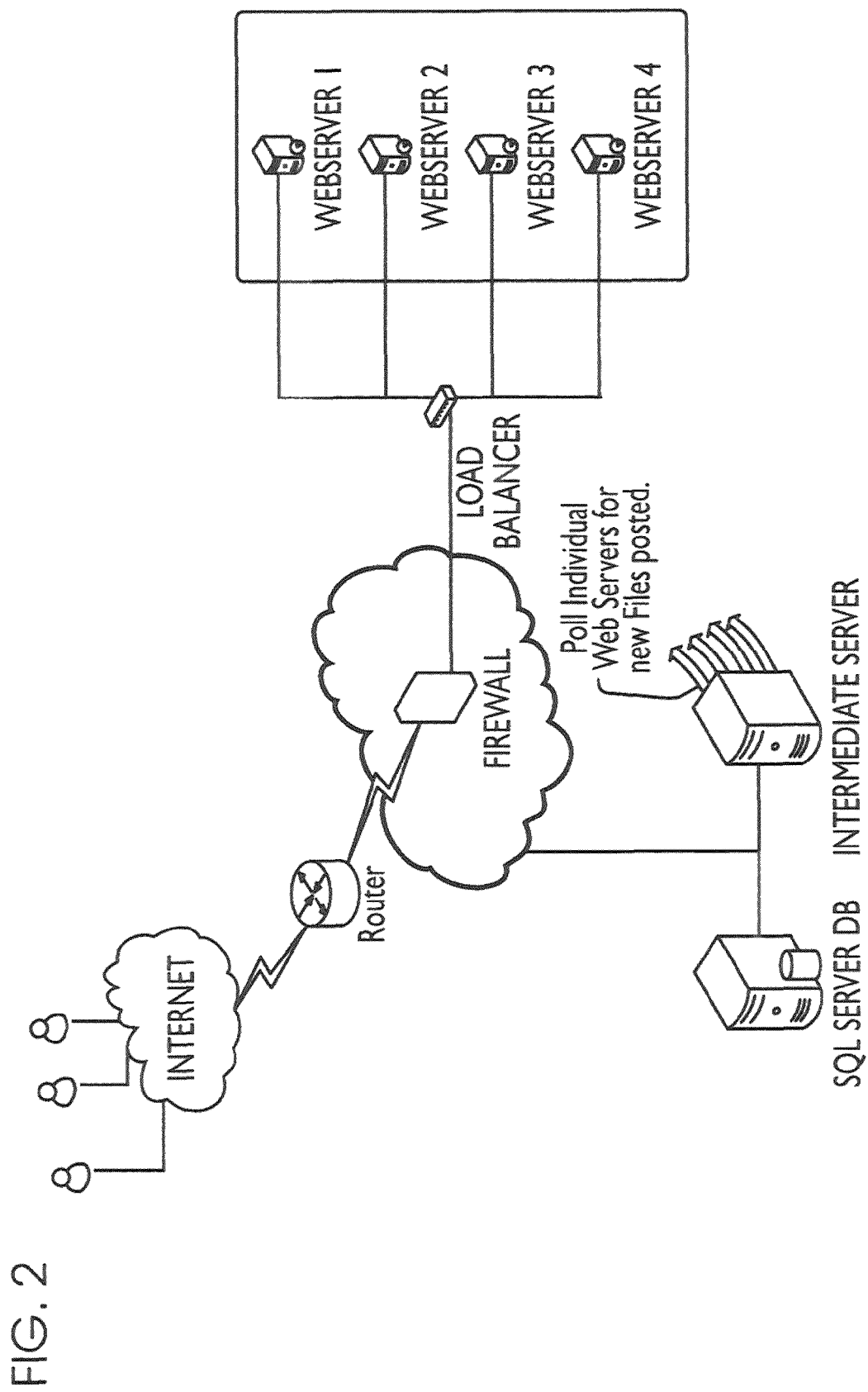
FIG. 2 illustrates a second aspect of the system of the invention.

In one aspect of the invention shown in FIG. 2, the system can be hosted on a cluster of web servers, which may be LINUX based. Each request can be routed to a specific server by a load balancer. The load balancer decides which server should process a request based upon the current request-load of the available server(s). The database(s) can be, but are not limited to, SQL databases (by Microsoft and others), Oracle databases, 4$^{th}$ Dimension databases, InterBase databases, and Apache databases. It is contemplated, however, that any suitable database may be used for the present invention.

In one aspect of the invention, the uploaded files are initially stored on the web server itself. A LINUX based intermediate server pulls these uploaded files from the web server and places them within a path in itself. A separate process that runs on the intermediate server can copy these files to a LINUX based file server.

Applications of this type can be built and programmed using one of many different types of architecture including, but not limited to J2EE (Java 2 Platform, Enterprise Edition) and Microsoft .NET platform, UNIX Daemon platform, and CORBA platform. It is contemplated, however, that any suitable platform can be used to build the code of the present system.

Connection to the web server on end user terminals 115 would use one of many available internet browsers including, but not limited to, Microsoft's Internet Explorer, Apple's Safari, and Mozilla's Firefox. Via the Internet 120, the end users access the first graphical user interface 140, which may be an http-based website, although other graphical user interfaces can be used with the present system. The first thegraphical user interface 140 is accessed by an end user and is used to input information regarding one or more claims (some specifics of which are discussed below).

The information entered by an end user via the first graphical user interface 140 can be encrypted before transmission over the Internet for additional security. There are several commercially available encryption programs or algorithms available including, but not limited to, PCI Encryption Algorithm, TrueCrypt, a Symantec encryption program, Blowfish, and Guardian Edge. In one aspect of the invention, the encryption algorithm can be a free to use open source 128-bit encryption algorithm. Symmetric algorithms can be used to encrypt the data. These can use key lengths of 40, 56, 64, 80, 128, or 256 bits. In one aspect of the invention, a password of 128 bits can be used (i.e., a password consisting of 16 characters to encrypt/decrypt the file that is being uploaded). It is contemplated, however, that any suitable encryption algorithm or program can be used in the present system. The information can be decrypted by the transient, or intermediate server 150 and moved to the internal server 170, prior to storage on the internal database 180.

The graphical user interface 140 also facilitates the uploading of files. When files are identified for upload, they are each tagged with pointers via pointer code 130, so that, after the files are actually physically uploaded to the web server, the documentation can be scanned for malicious code on the end user terminal 115 by anti-virus code 135. Anti-virus code 135 can detect and remove or repair malicious code. Alternatively, if malicious code is detected, the entire process can be terminated. In one aspect, the Clam Antivirus code is an open source (GPL) anti-virus toolkit for UNIX, and designed especially for e-mail scanning and document scanning on mail gateways. It provides a number of utilities including a flexible and scalable multi-threaded daemon, a command line scanner and an advanced tool for automatic database uploads. The core of the package is an anti-virus engine, which is available in the form of a shared library. It is contemplated, however, that any suitable antivirus software program can be used by the system of the invention, including, but not limited to, McAfee, Symantec's Norton Antivirus, CA Antivirus, BitDefender Antivirus, and Frisk Software's F-Prot. After determining that the files do not contain malicious code, the documents can be saved to the transient web server 150 and stored on the transient database 155, through a firewall 125.

It is contemplated that any suitable firewall can be used in the present system. Firewall 125 may be, but is not limited to, network layer (or packet filter) firewalls, stateless firewalls or firewalls that filter information based on one of many parameters. The firewall may be one of many commercially available firewalls including, but not limited to, a Cisco firewall, a Microsoft firewall, Norton Internet Security, and Comodo Firewall Pro. In one aspect of the invention, the web servers are available behind the first firewall 125, which adds to the security of the server environment. All information that is transacted through the firewall can be ensured to be reasonably secure.

A second firewall 160, which may be the same or different type as the first firewall 125, may be operably placed between the internal web server 170 and the transient web server 150. Anti-virus code 135 may perform scans of the incoming files on the transient server 150 prior to further transferring the files to an internal web server 170. The internal web server 170 may be operably connected to an internal database 180. The internal database 180 may comprise one or more physical databases. The internal database 180 provides storage of information and files relating to the multi-claimant cases, the claimants, and any settlement or judgment that affects the relief afforded to the eligible claimants. In addition, the internal database 180 provides storage for information relating to institutions, and end users.

The company coordinating the claim databases relating to the administration of the class action lawsuit resolution and the disbursement of relief can maintain a second user graphical interface 175 and an internal network 185, to which internal users' terminals 190*a*, 190*b*, 190*x* may be connected. The internal network can be a local area network (LAN), a wide area network (WAN) and can use a wide variety of operating systems, including, but not limited to, UNIX, LINUX, MAC OS, or Windows (XP, VISTA, etc.) The internal network 185 is operably connected to the internal web server 170, which is in turn, operably connected to the internal database 180. Information regarding the pending and completed administrations, as well as claimant, end user, and institution information is stored on the internal database 180.

As shown in FIG. 1, the pointer code 130, the anti-virus code 135, and the first graphical user interface 140 may be located on the transient server 150. It is contemplated, however, that the pointer code 130, the anti-virus code 135, and the first graphical user interface 140 may be located on the internal server 170 instead, on both the transient server 150 and the internal server 170, or on a remote server (not shown), as long as the system and method are functional in substantially the manner described herein.

The figure also depicts the second graphical user interface 175 as being located on the internal server 170. As above, however, the second graphical user interface may be located on the transient server 150, both the transient server 150 and the internal server 170, or on a remote server (not shown).

The placement of the pointer code 130, the anti-virus code 135, the first graphical user interface 140 and the second graphical user interface may be determined by several parameters. There is, however, a greater security risk to the system if these objects are located outside of the firewalls. Conversely, if these objects are all placed within both firewalls, either larger and more costly firewalls would be required, or the system would be slower.

The system may also contain other code 145, and as before, the other code 145 can be located on the transient server 150, the internal server 170, both the transient server 150 and the internal server 170, or a remote server (not shown). This other code can include, but is not limited to, code for validating a registering institution and institutional contact; code for transmitting information identifying a registering end user to the institutional contact; code to provide links to the institutional contact that indicate acceptance or rejection of the registering end user; code to provide options selected from deleting the claim, holding the claim, or accepting the claim to the institutional contact; code allowing a registered end user to monitor the status of at least one claim; code allowing the institutional contact to monitor the status of at least one claim; code that facilitates sending messages relating to deficient claims; code that facilitates completing a claim; code for transmitting a message to the institutional contact if a claim is not completed within a predetermined time period; code for automatically transmitting a message containing the institutional database record to one or more predesignated individuals for review; code providing links indicating acceptance or rejection of the institution; code for providing notice to the one or more predesignated individuals that the institutional database record has been reviewed; and code for notifying the institution of acceptance or rejection.

FIG. 1 illustrates only one particularized deployment of the invention, without showing all possible permutations of the system. For example, the web server may be implemented as one physical web server or two or more physical web servers that are interconnected via a load balancer to the client, or end user, machines, as shown in FIG. 2. The load balancer may be, but is not limited to, a Cisco load balancer, a Barracuda load balancer, a Kemp Technologies load balancer, or any other suitable load balancer.

Figure 3A:
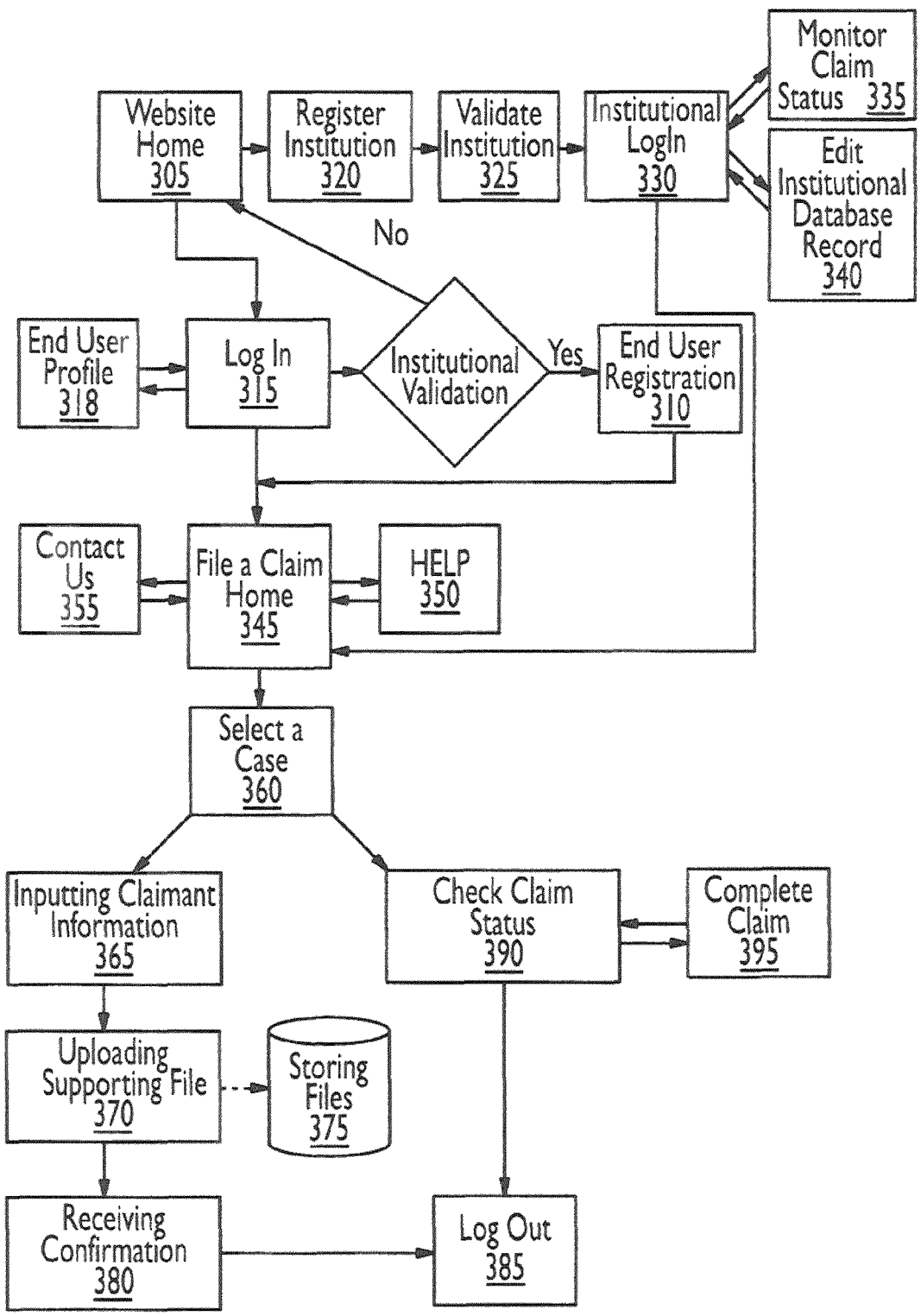
Figure 5:
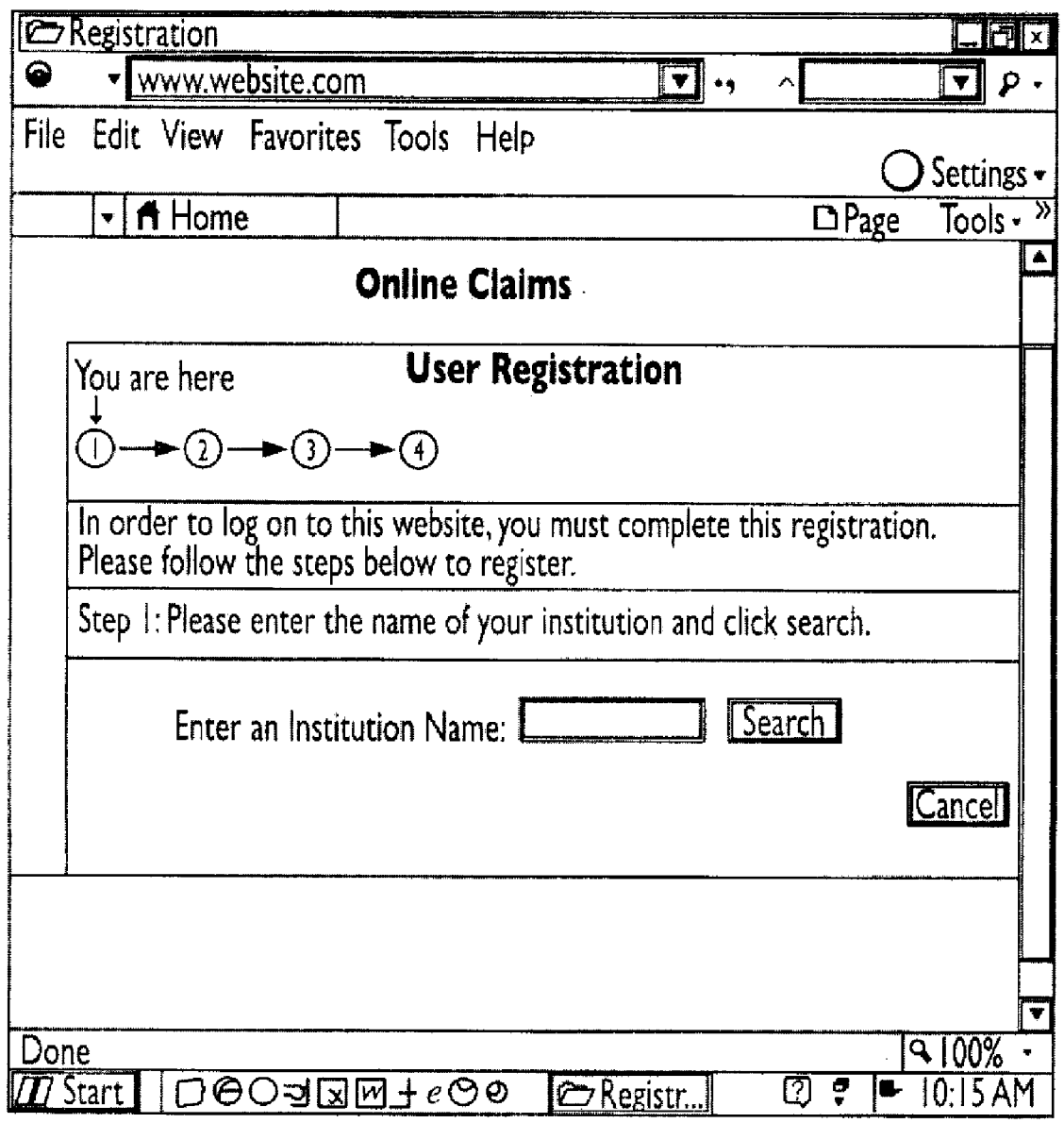
FIGS. 5-7 are illustrative views of graphical user interfaces of exemplary user registration screens.
Figure 6:
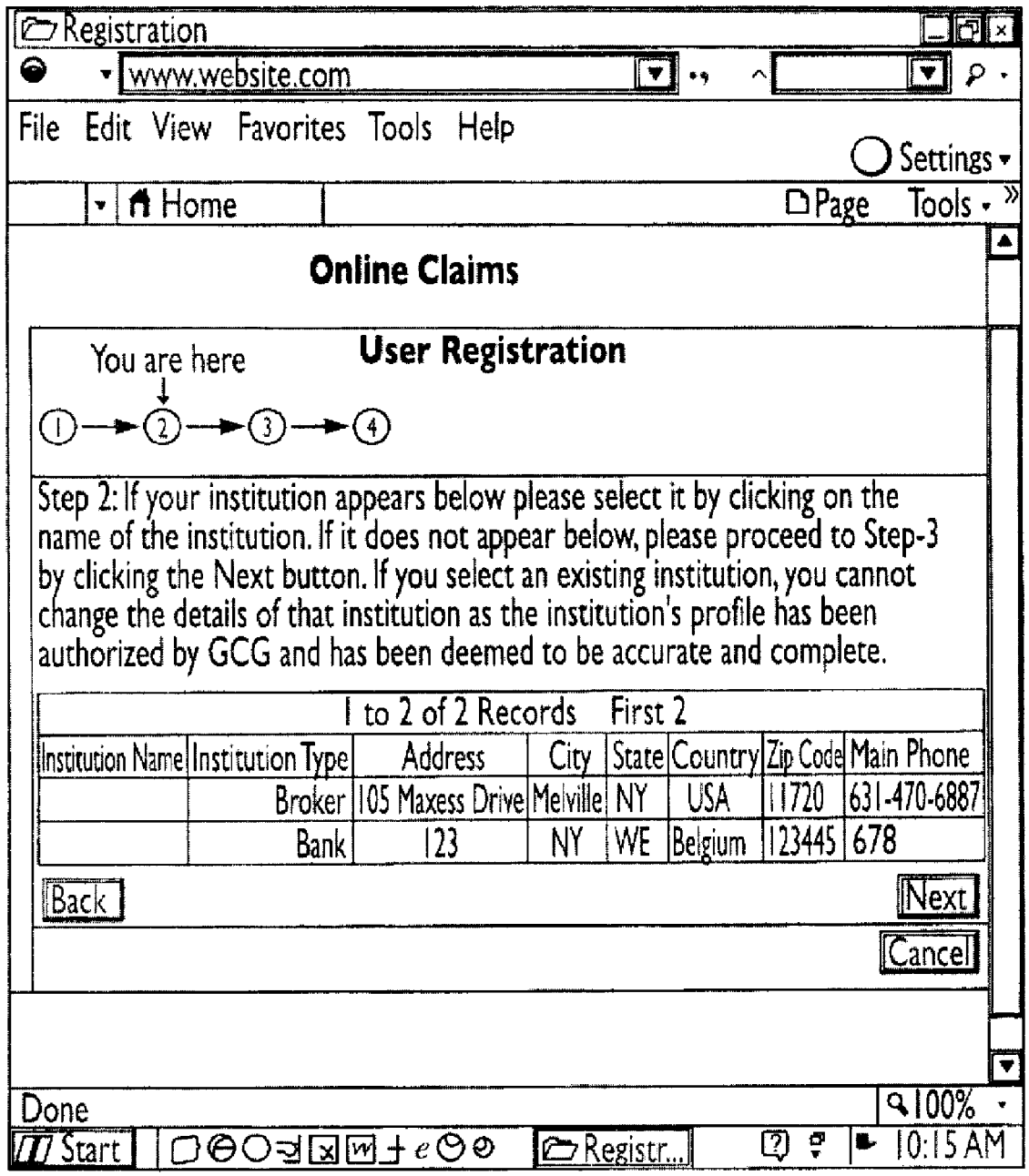
Figure 7:
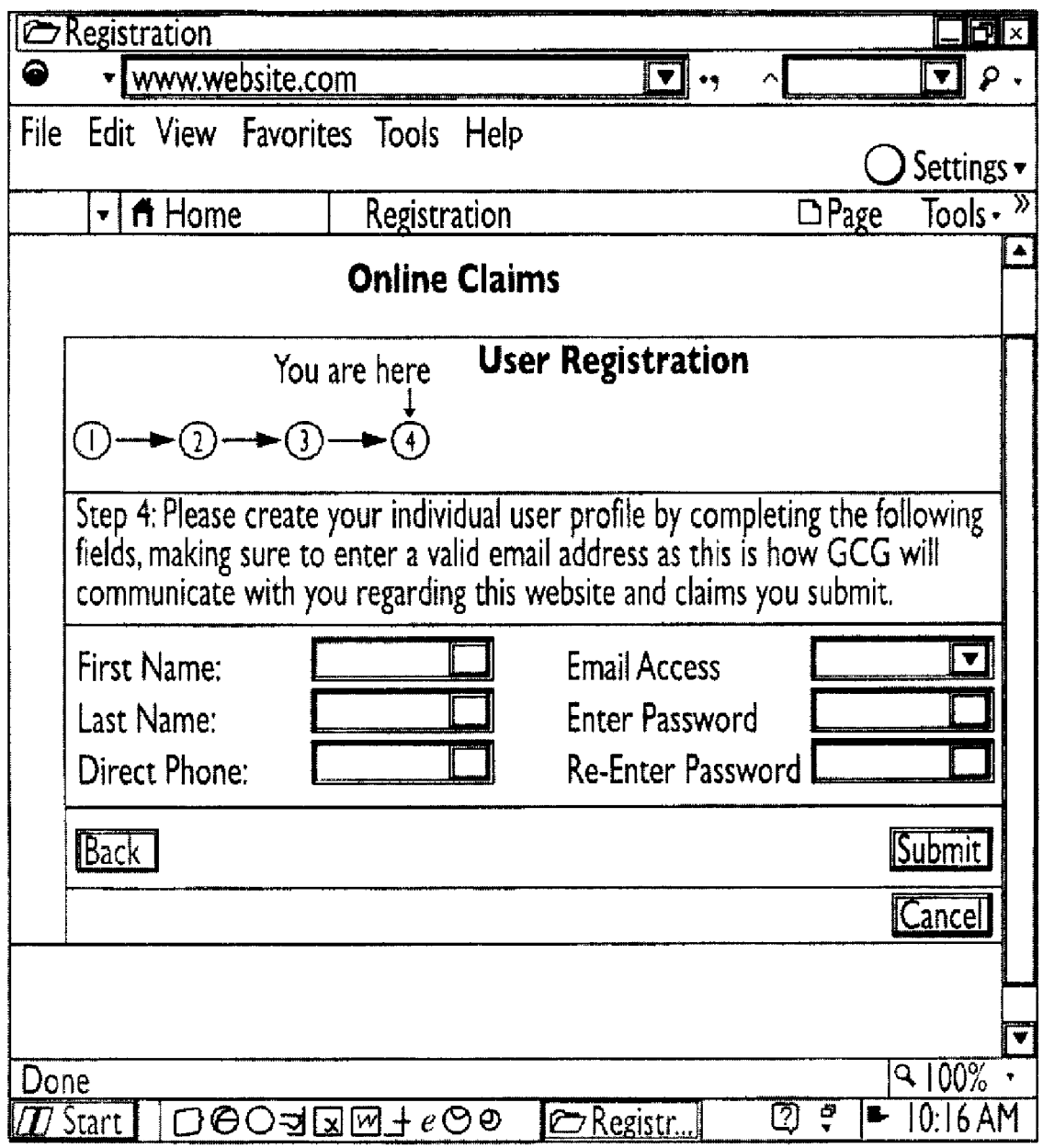

FIG. 3A is a flow chart depicting the process of filing a claim by an institutional end user. When an end user accesses the system of the invention, a website home page (not shown) welcomes the end user to the class action lawsuit claim system of the invention. If the end user has not yet registered, he or she is prompted to select an institution to which the end user is affiliated. The end user will enter the name of the institution and/or select from a list of institution names. These steps are illustrated by FIGS. 5 and 6. FIG. 7 illustrates the entry of end user information. First, an end user associated with an institution 105 or as an individual investor 110 accesses the graphical user interface 140, which may be a website 305, via the Internet 120 using a client terminal 115. The end user will then be prompted to register 310 or log in 315. If the end user is a new end user, he or she may register 310 by associating their information with an institution that has been previously registered 320 and validated 325 with the company that is administering the multi-claimant proceeding. As exemplified in FIGS. 5-7, the end user can then be prompted to enter information for use in user validation at a later time. Here, an end user can create a profile and/or enter user information, and associate with his or her institution. Alternatively, if an end user is already registered, he or she can log into the system directly and begin filing claims or reviewing claim status and history. End users can edit their profiles on website pages (not shown). It is contemplated that an end user may view and modify information related only to that information entered into the database by that end user. In addition, there is an option to edit an institution database record that can be selected (not shown). However, this action can only be performed by a person affiliated with the institution and designated as the institutional contact. It is contemplated that there may be more than one institutional contact designated. The institutional contact may view and modify information entered by end users associated with that institution. However, while the institutional contact may view all information, he or she might not have the right or ability to modify all the information, depending upon the rights of access granted by an administrator.

The administrator will have the ability to view and modify all information relating to the lawsuit resolution. This information includes, but is not limited to, institutional information, lawsuit information, end user information, claimant information, transaction information, and lawsuit resolution information.

Of course, because of the robustness of the method, an administrator, an institutional contact, and/or an end user can easily navigate between multiple lawsuit, multiple claimants, and multiple transactions, where they may view input, or modify the records in a single session, depending upon their authority and the rights granted to them.

Figure 4:
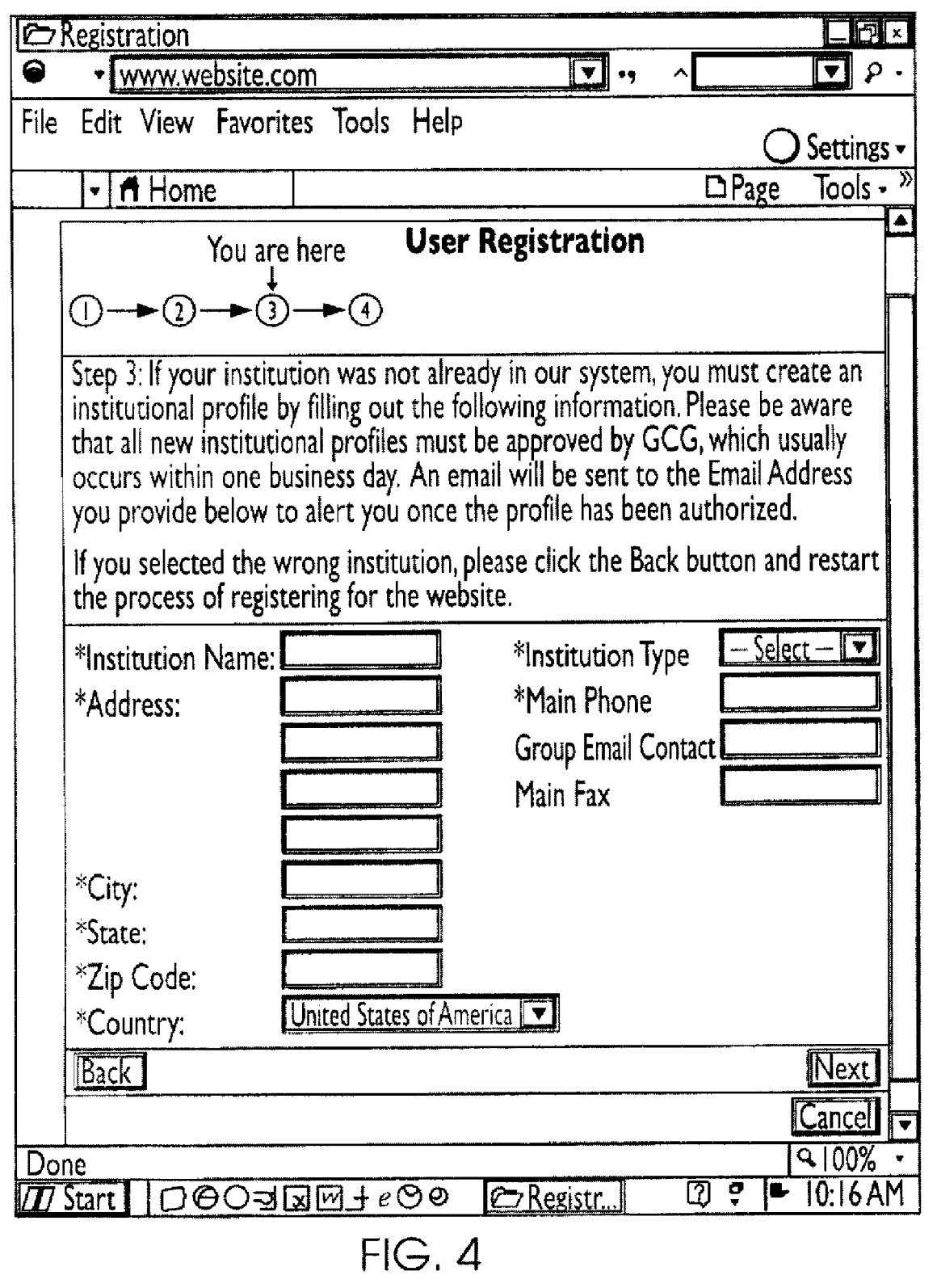

The institution information comprises an institutional database record that contains institutional contact information. The institutional contact can log in to the website 330, monitor claim status 335, edit the institutional database record 340, as well as enter and file claims 345. As shown in FIG. 4, the institutional database record may include the institution's name and address, institutional contact, and additional information regarding the institution.

Figure 3B:
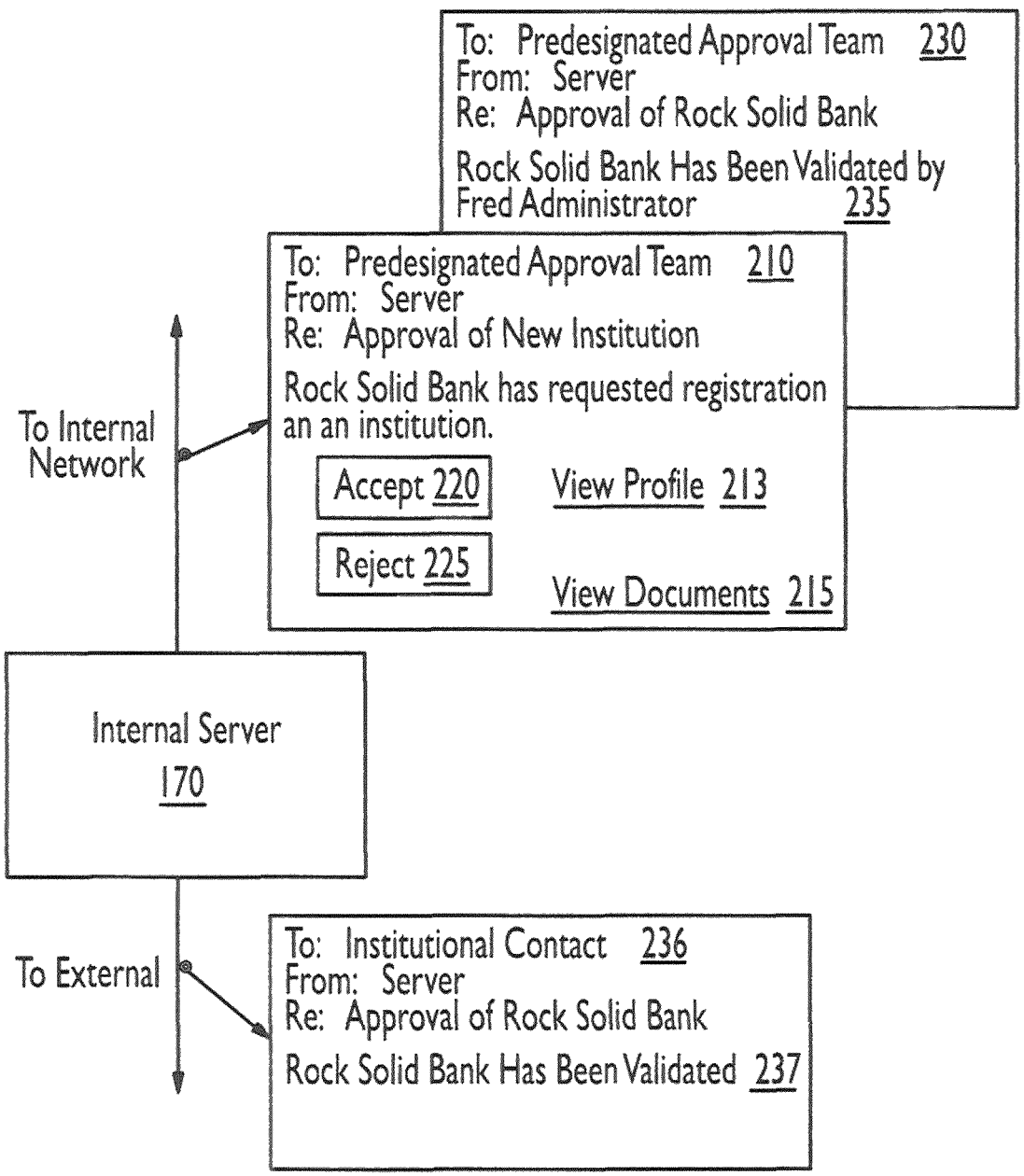

When an institution 105 registers (e.g., a bank named Rock Solid Bank), a message 210 containing links to the institutional database record 213 and supporting documents 215 can be automatically transmitted a message to one or more pre-designated individuals for review. The supporting documents can include, but are not limited to tax forms, SEC forms, and institutional records relating to the lawsuit. As shown in FIG. 3B, the message may contain links 220 and 225 indicating acceptance or rejection of the institution. After one of the predesignated individuals reviews the institutional database record and accepts or rejects the institution 105, notice 230 can be provided automatically to the other individuals that the institutional database record has already been reviewed 235. A message 236 to the institutional contact can also be sent, informing the institutional contact of the status of the registration request 237.

FIG. 3C illustrates messages that are transmitted to an institutional contact from the system relating to the approval of an end user registration. The internal server 170, transmits data to an internal database 180 end user data 241, 242, 243 is stored. When an end user requests affiliation with an institution (e.g. Rock Solid Bank), the system will automatically send a message 245 to the institutional contact at Rock Solid Bank asking for approval or rejection of the end user, e.g., Joe User 242. The message 245 can contain links to either accept 250 or reject 255 Joe User 242 as a registered end user, which would send information regarding that acceptance or rejection back to the web server (perhaps via the firewalls and intermediate server). In one aspect, if an end user is rejected, the profile relating to that end user may be deleted, as also illustrated in FIG. 3C. Alternatively, if an end user is not approved, the database will retain the end user information and his or her unapproved status (not shown).

In this aspect, the system and method as described allow an end user to register and immediately access information and file claims. There is no wait period necessary where the end user must be validated. Rather, validation of the end user can be performed after the initial registration. In the event that an institution or the administrating company cannot validate an end user, the administrating company can either delete the files inputted by the non-validated end user, or give an institution options regarding the files. For example, the institution can request that the administrating company hold the information for a specified period of time, or until the end user (the same or a different one) can be validated and the claims processed correctly.

Figure 8:
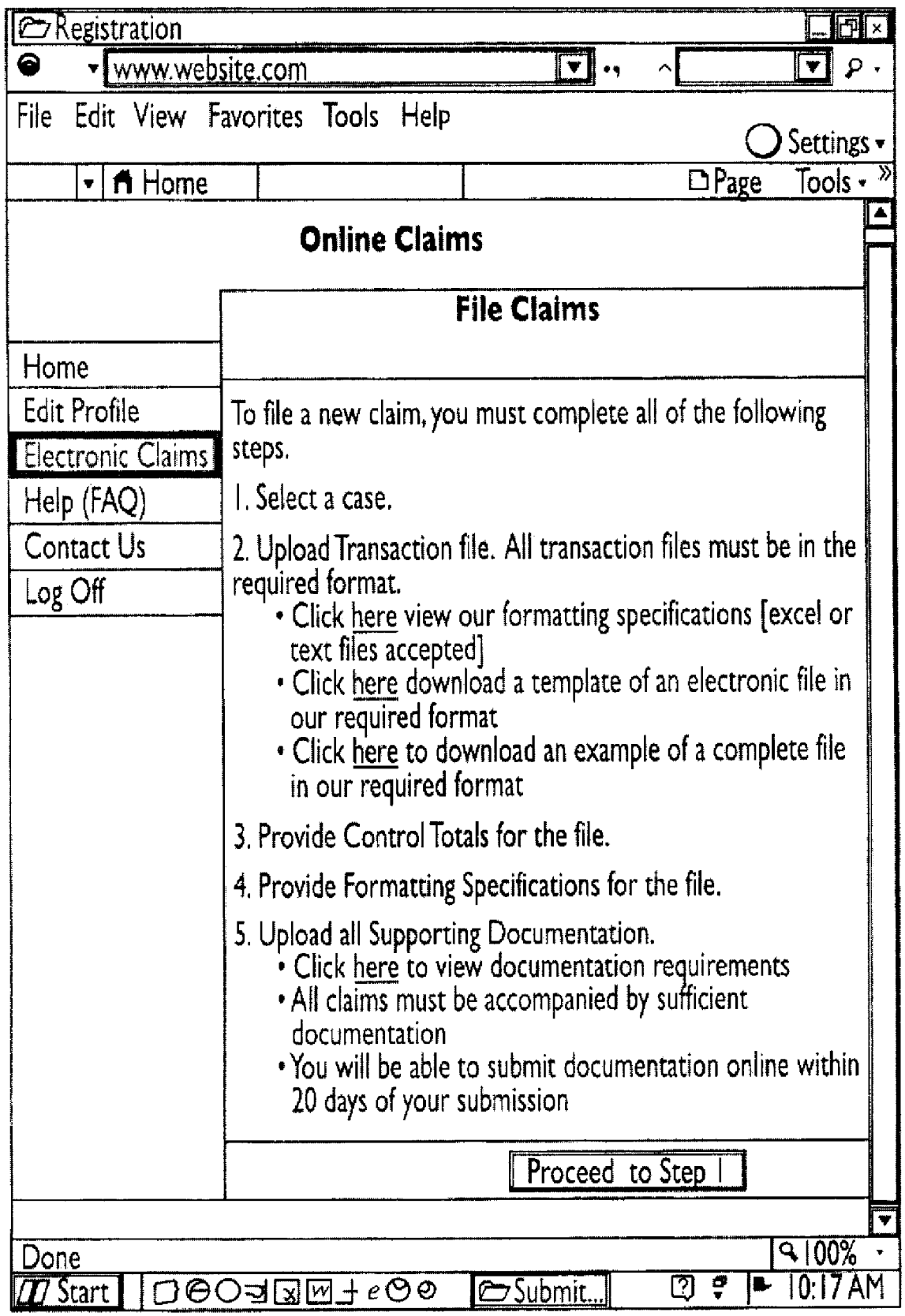
FIG. 8 is an illustrative view of instructions for filing a claim.

After the user logs in 315 to the website 305, he or she can be brought to the home page for filing claims 345. At this stage, if the user needs help with filing claims, he or she can either access a contact page 350 for information on how to contact the lawsuit administrators or access a help page 355 that houses a frequently asked question information source. The end user can also modify their profile 318. At this point, an end user can be prompted to select between filing a claim or reviewing the history and status of a previously filed claim (not shown). FIG. 8 exemplifies a screen that gives the end user access to FAQs, contact information, and help pages. FIG. 8 also illustrates end user instructions for the filing of a claim or claims.

Figure 9:
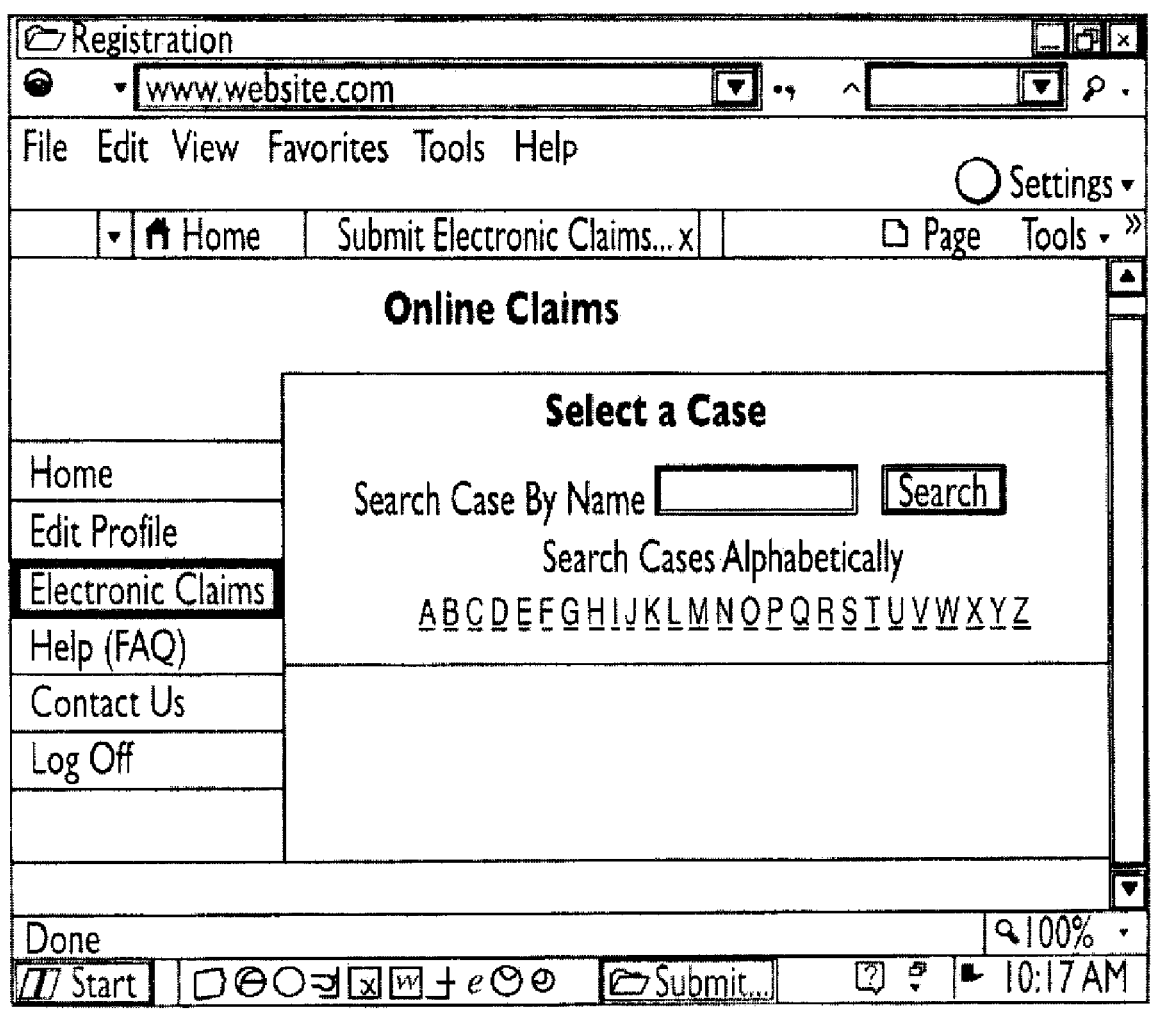
FIG. 9 is an illustrative view of how to select a case, where cases are listed by letter.
Figure 10:
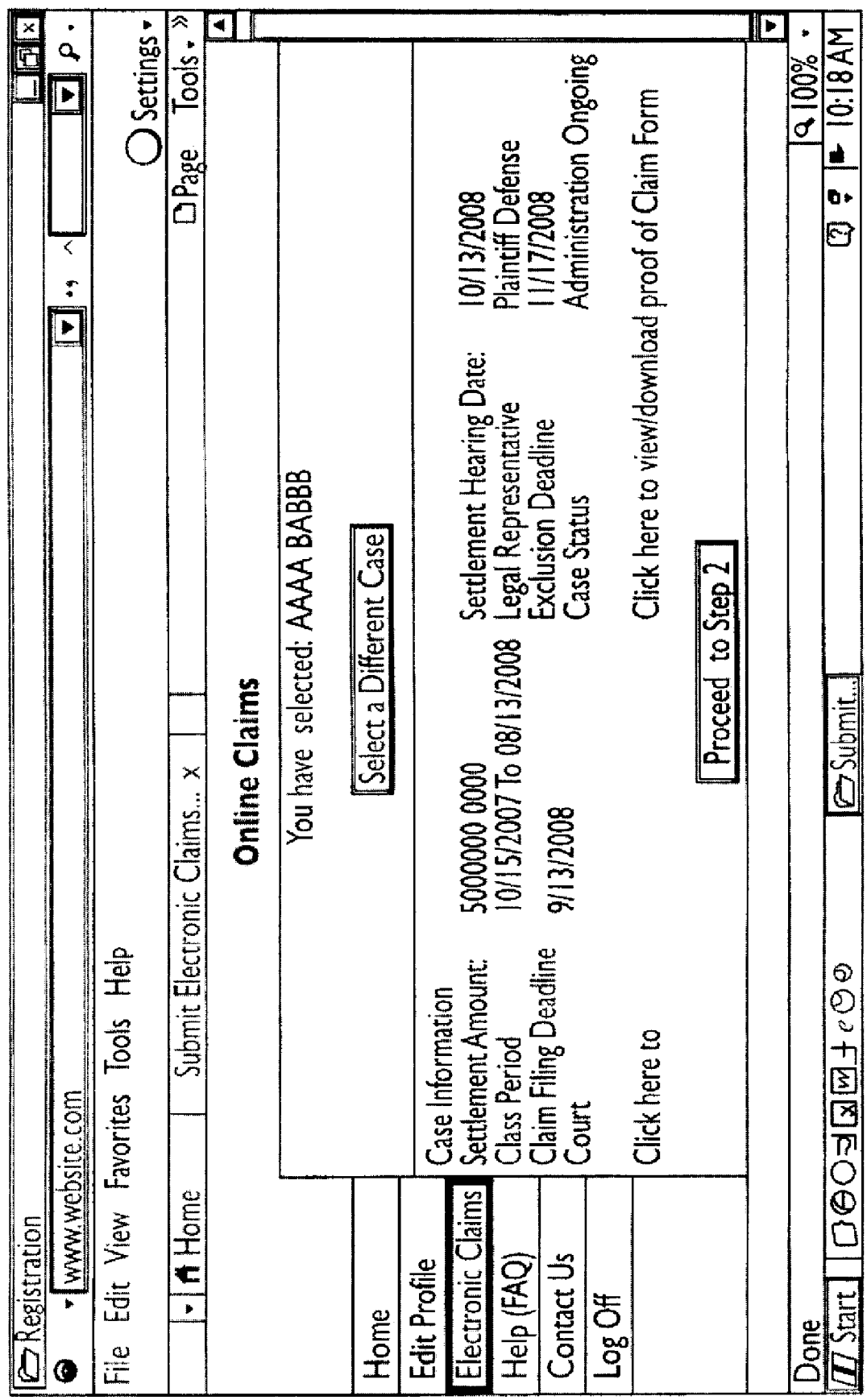
FIG. 10 is an illustrative view of case information for the selected case.

Prior to filing one or more claims, the end user is prompted to select a case 360. As shown in FIG. 9, cases can be selected by entering the name of the case directly or by searching via the alphabet. Once the end user has navigated the graphical user interface 140 to a specific case (see FIG. 10), the end user can then file claims by inputting case information 365 relating to that particular lawsuit. This information may include, but is not limited to the case status, case due dates, the defendant and plaintiff information, when the case was filed and in which court, as well as any settlement or judgment amount. It is contemplated that the case information can include any information deemed pertinent to the lawsuit.

Figure 11:
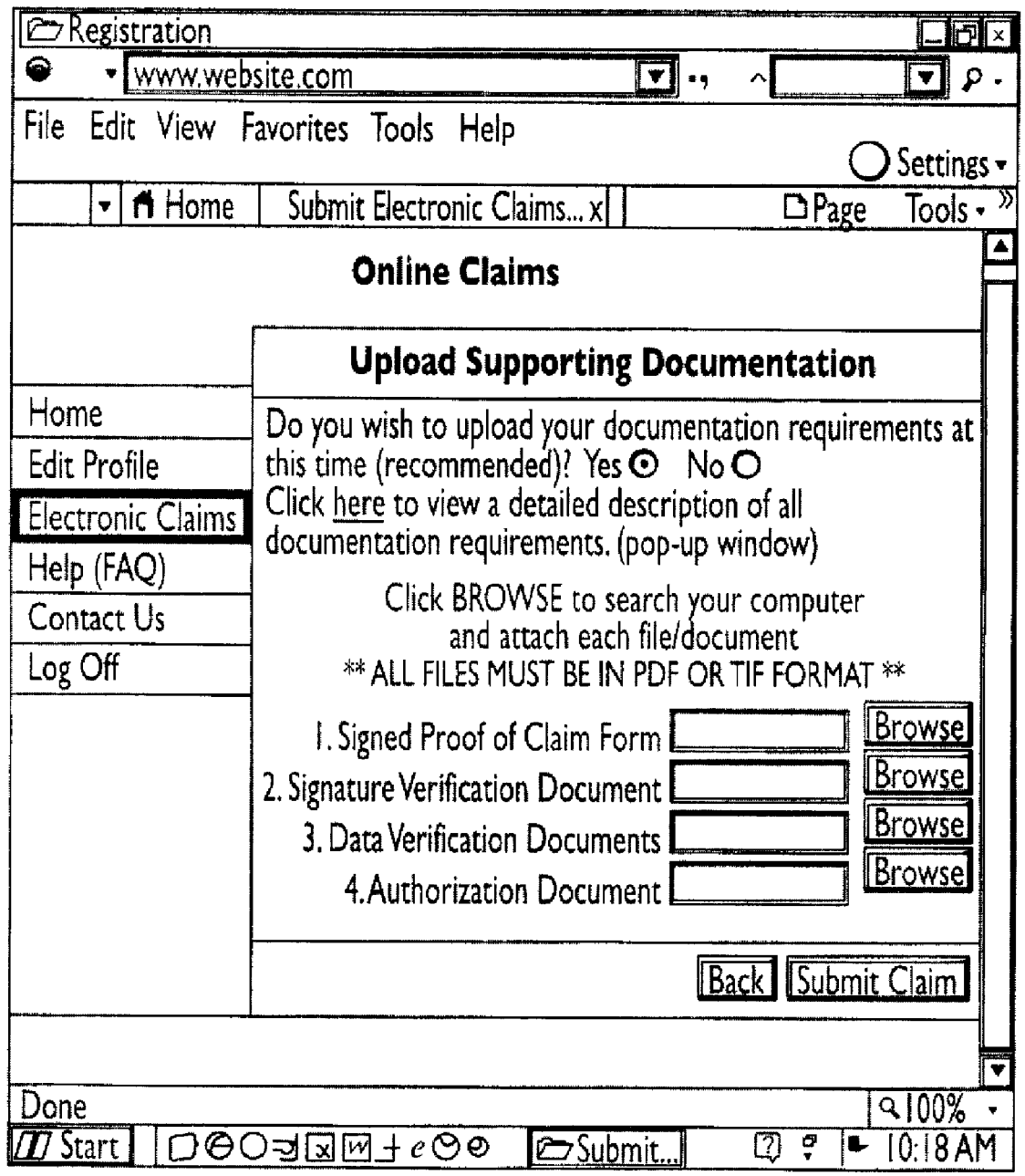
FIG. 11 is an illustrative view of a graphical user interface for the upload of supporting documentation.
Figure 12:
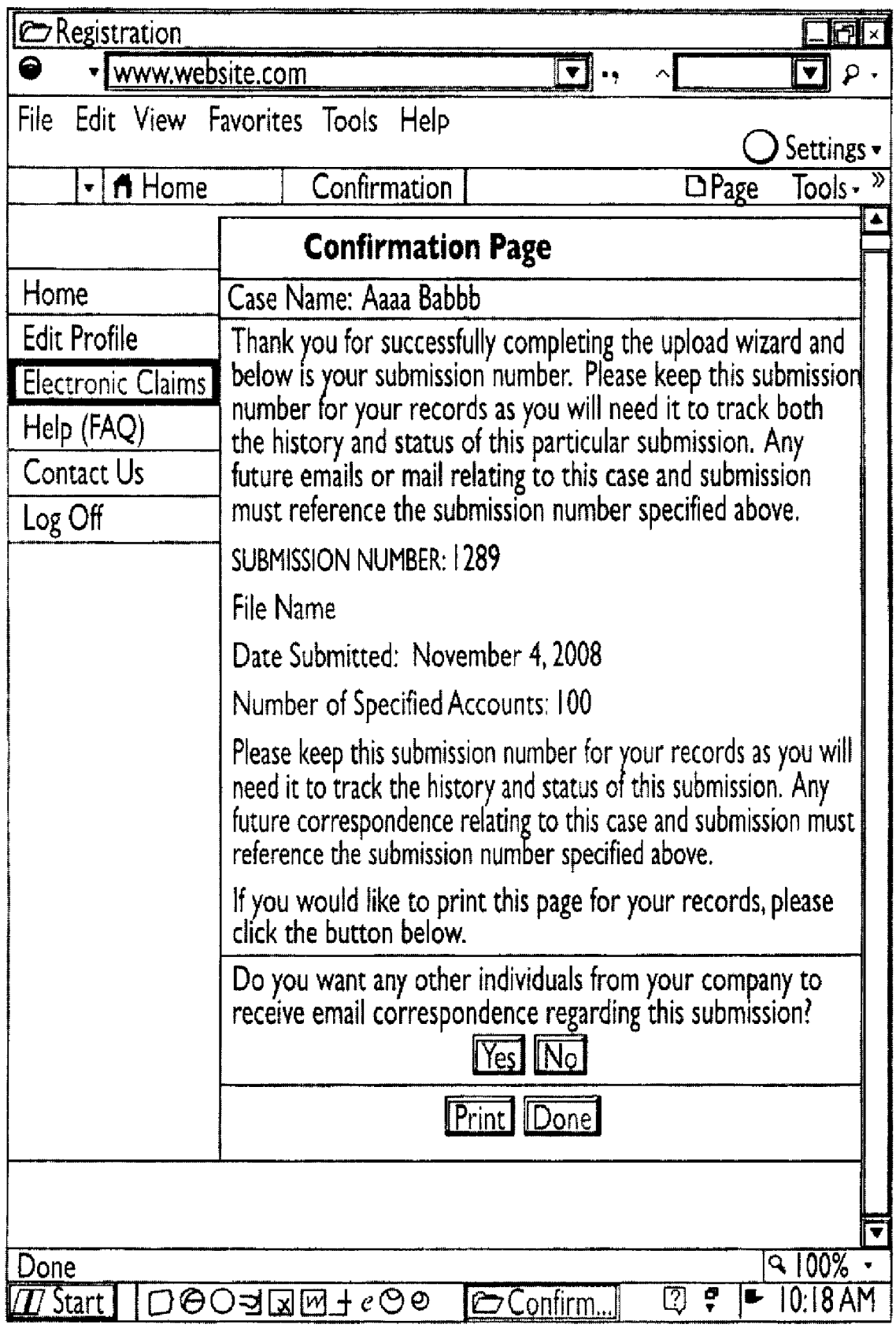
FIG. 12 is an illustrative view of a confirmation page.

After entering the information relating to the claim, as depicted in FIG. 11, the end user can then attach the supporting documentation files 370. Here, there are four supporting documents required, although this number may vary by the case. The supporting documents can include, but are not limited to a signed proof of claim form, a signature verification document, a data verification document and an authorization document. Other documents that may be required include, but are not limited to, stock certificates, verification of sales and purchases. It is contemplated that any supporting documents required by the specific lawsuit can be filed. As discussed above, the file paths entered into the system via the end user terminal 115 actually will have pointers associated with them by pointer code 130, which then may be used to scan the information and documentation for malicious code after uploading to the web server and database. As shown in FIG. 12, after the end user enters the information and uploads the supporting files, the user can receive confirmation that the claim filing and supporting files were received 380. The end user can then log out 385 of the system.

By way of example, and not of limitation, it is not unusual for an institution to file claims on behalf of tens or even hundreds of claimants in numerous lawsuit resolutions. In addition, for many claimants, their claims may be based upon multiple transactions, i.e., there is no technical limit to the number of transaction upon which a claim can be based, nor to the number of claimants. Table 1 is a tree showing potential relationships between institutions and claimants and their transactions for class action lawsuits. The present systems and methods support the institution's ability to track all of the claims filed on behalf of all of its customers (the claimants), including the underlying transactions, by presenting a graphical user interface that provides streamlined interaction and access to this information to facilitate the record keeping of each institution in regards to its participation in the administration of the resolution of one or more lawsuits. The institution may file claims in two or more lawsuit resolutions and manage these claims in each lawsuit resolution for multiple claimants.

Figure 13:
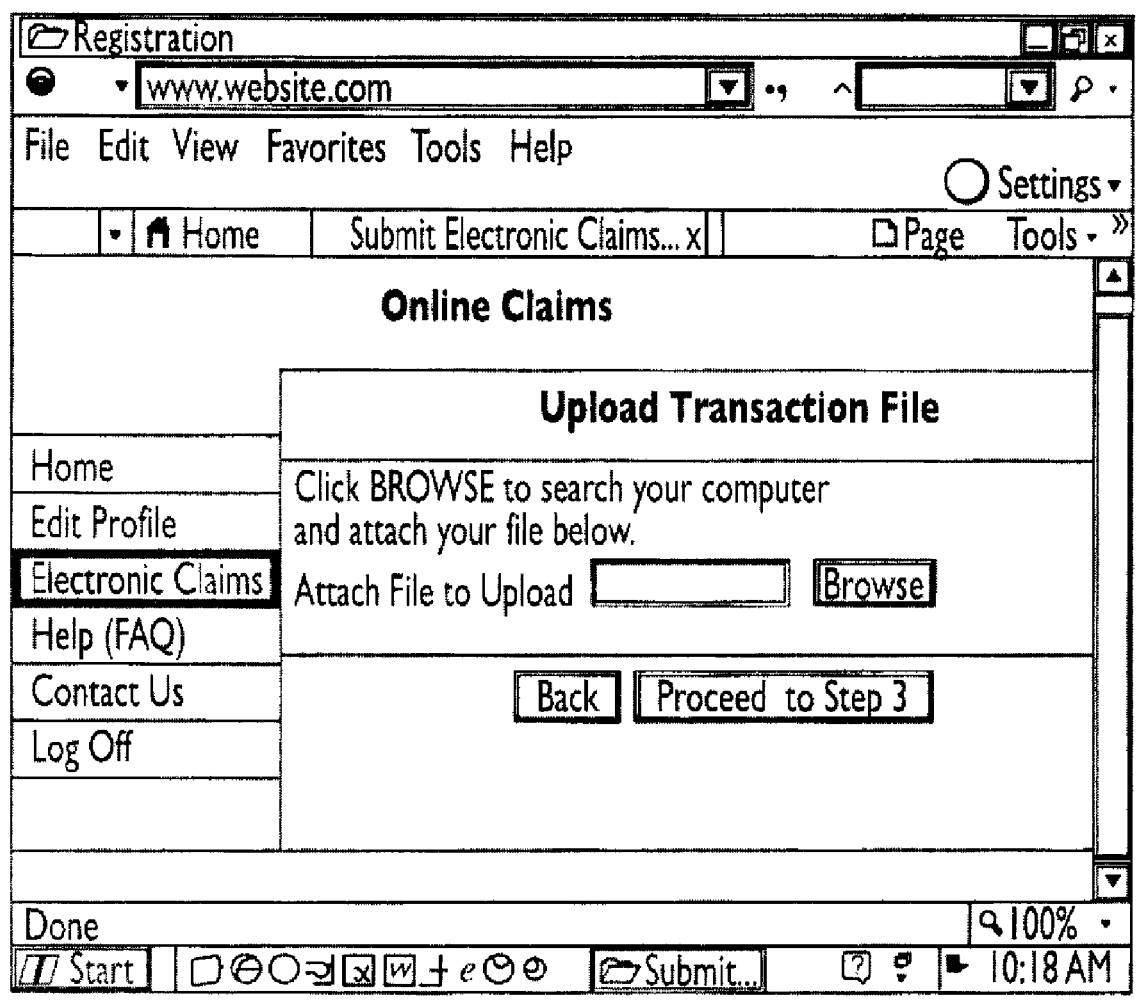
FIG. 13 is an illustrative view of how transaction files can be uploaded.
Figure 15:
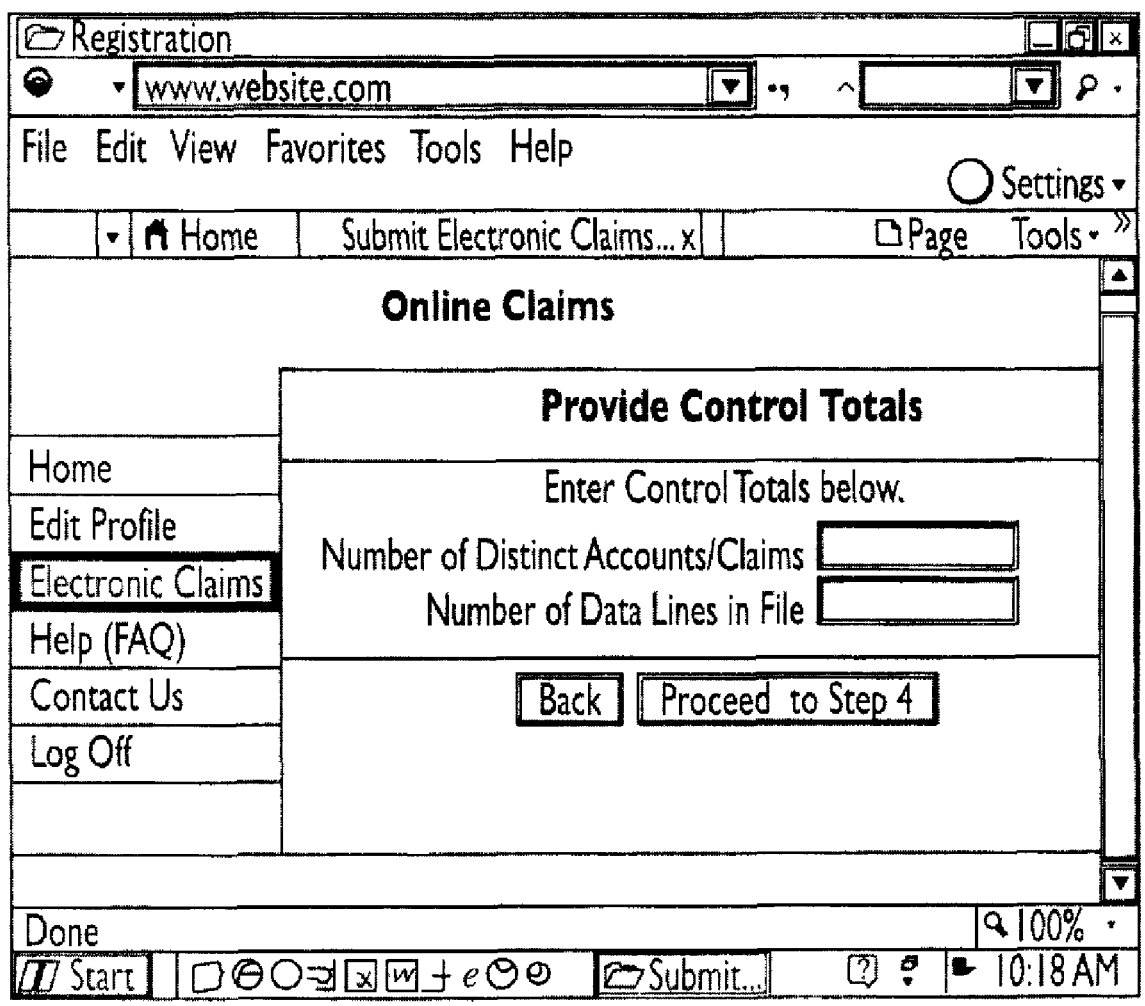
FIG. 15 is an illustrative view of how control totals can be entered.

As shown in FIGS. 13-15, the claimant information may be uploaded to the system 100 as batch transaction files. FIG. 13 depicts the screen where file path to the batch file may be indicated for upload as batch transaction files. The batch file to be uploaded can be located by browsing the end user's computer to locate the desired document or file. FIG. 14 depicts one interface for providing the formatting of that batch transaction file so the system can correctly load the files. FIG. 15 depicts how control totals for the batch files are uploaded.

Once the claim files are fully uploaded to the transient database through the first firewall, they can be moved to a folder for scanning and uploading through the second firewall. After the files are copied to the internal database, they can be verified to have migrated through the first and second firewalls safely and completely. Once the verification is performed, the files can then be deleted from the transient database.

Figure 17:
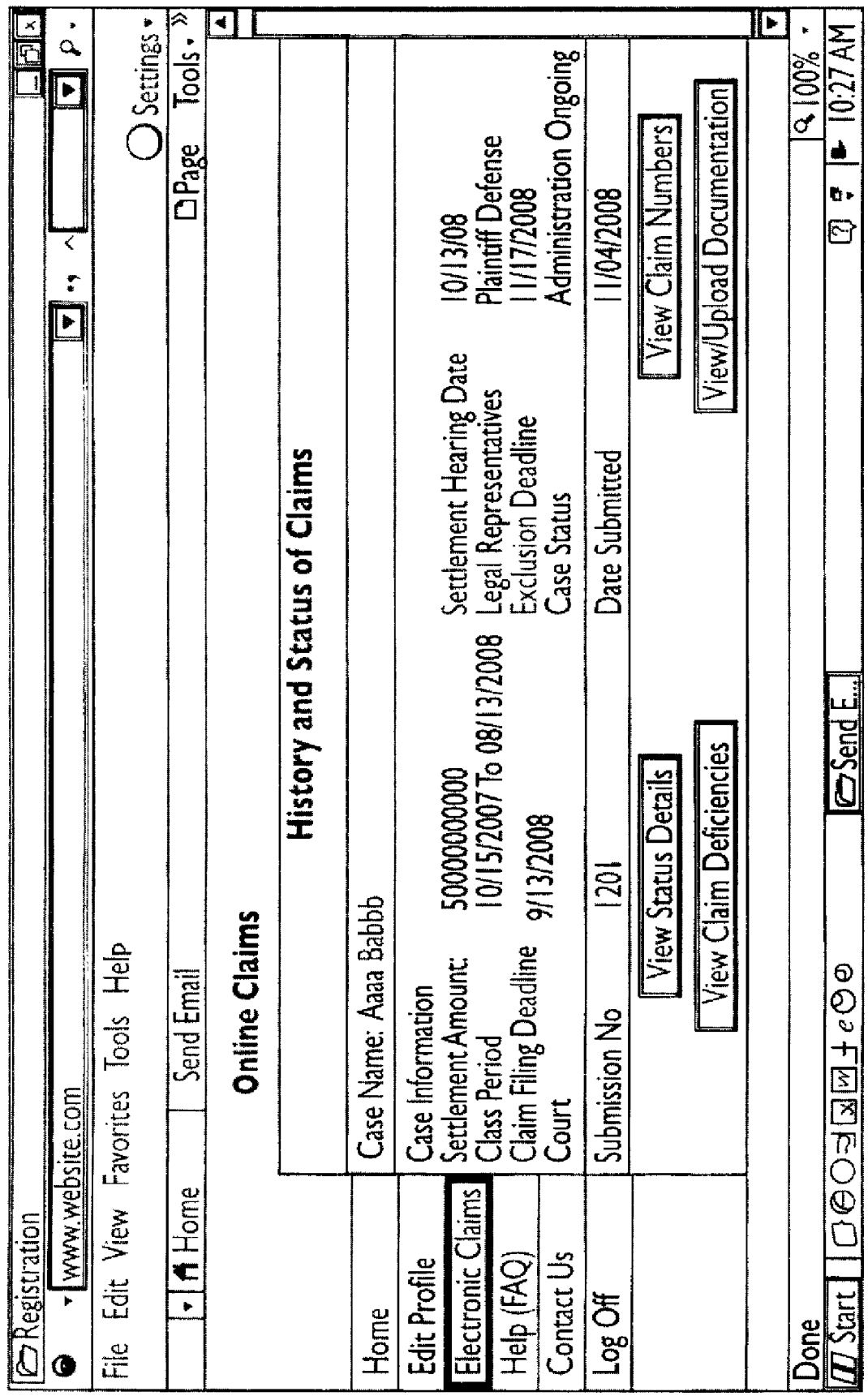
Figure 20M:
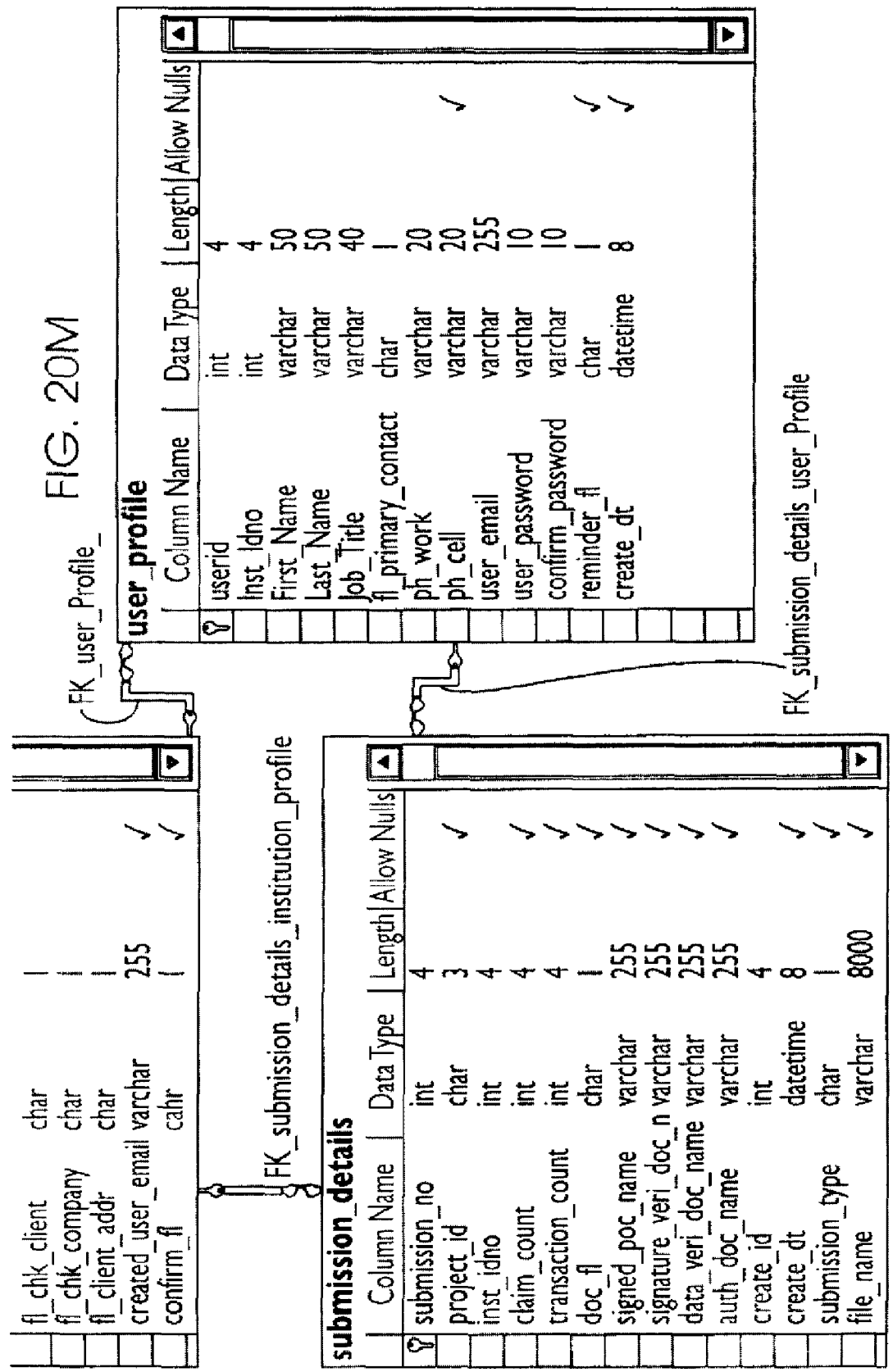
FIGS. 20A-20N are illustrative of database architecture for a system as exemplified herein.

Returning to FIG. 3A, after selecting a case 345, the end user can access previously filed claim information, including the claim history and status 390, as shown in FIGS. 16 and 17. Each specific submission should contain case information, status details, claim numbers, transaction information, supporting documentation and files, and deficiencies (if any). Here, an end user can provide any information that is missing from a deficient claim to complete the claims 395. After reviewing the information and updating the same, the end user can then, as above, log out 385.

Figure 3D:
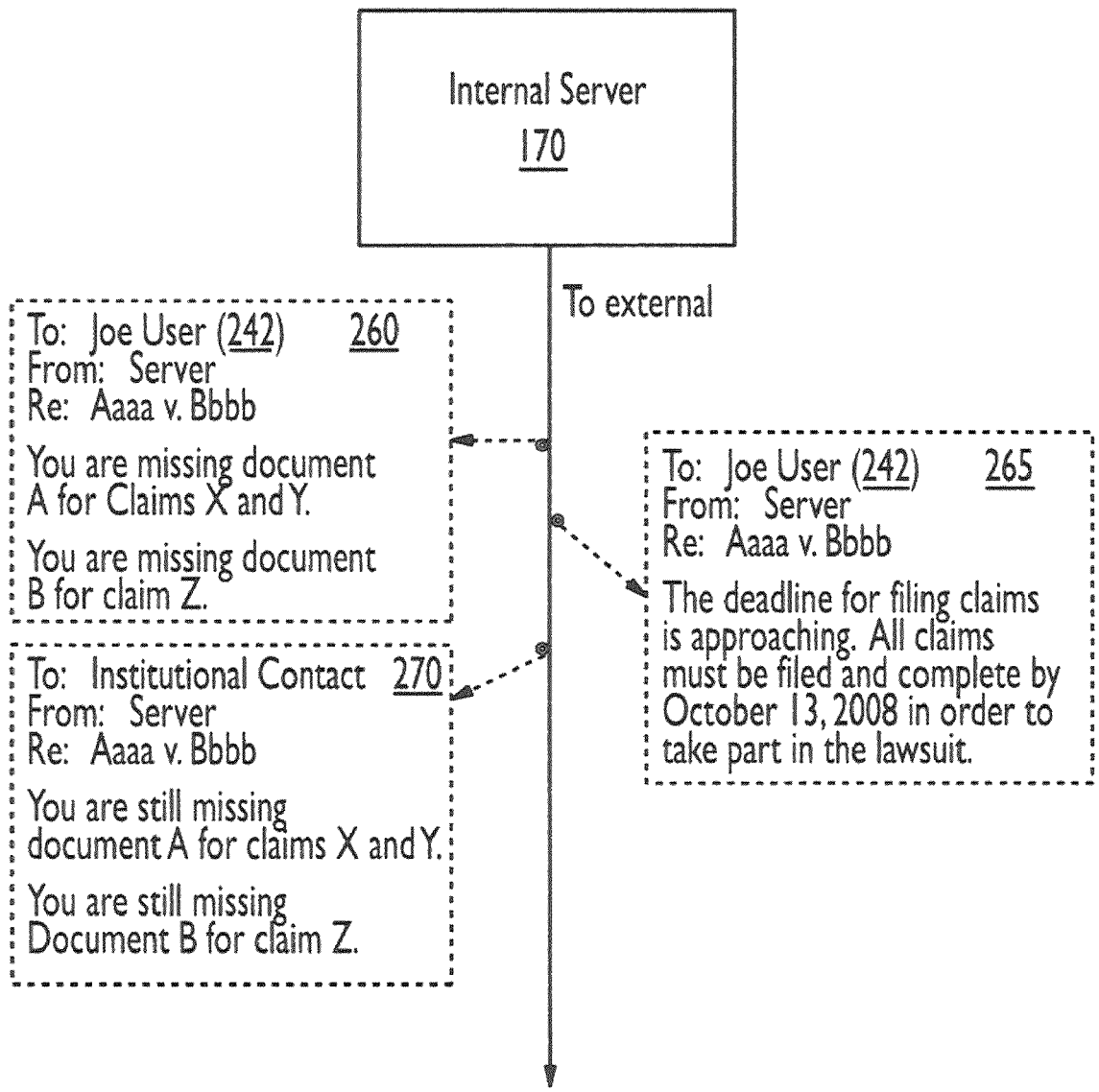

After a registered end user has completed at least the initial filing of at least one claim, the system may transmit one or more messages requesting additional information, or impending deadlines relating to the lawsuit. FIG. 3D illustrates two of the potential messages that may be sent. Message 260 informs a registered end user (Joe User 242) that certain claims are missing documents. Message 265 informs a registered end user that the deadline for filing and completing claims is approaching. If the claim is not completed within a predetermined time period, a message 270 can be transmitted to the institutional contact. It is contemplated that

TABLE 1

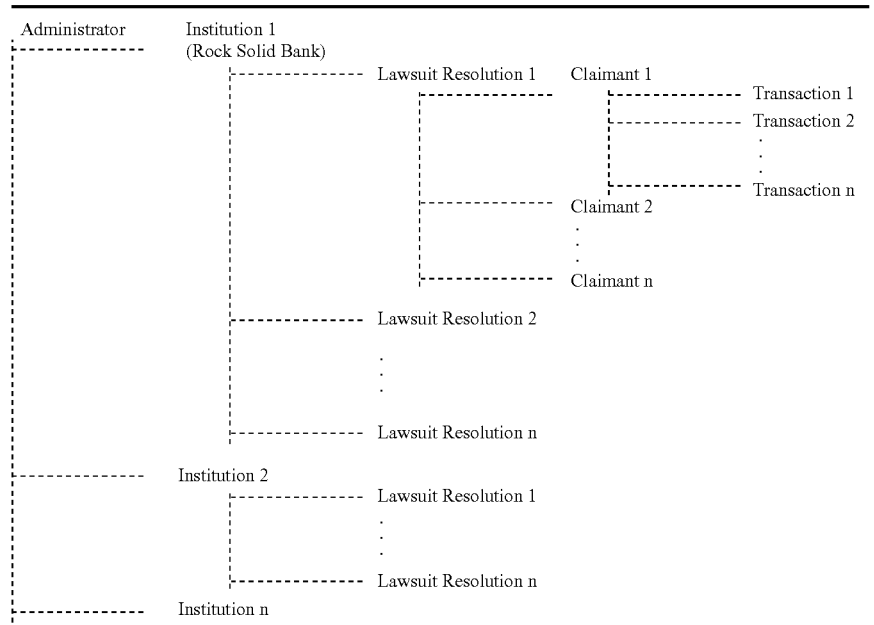

these messages may include legal disclaimers, as well as other terms and conditions relating to those messages.

If a registered user has forgotten a password during subsequent log-ins, a "forgot password" system can be incorporated into the system. The system of the invention comprises a help section. Information related to the system can be located by using the Frequently Asked Questions (FAQ) section (not shown). If additional help is needed, a section with contact information is also included (not shown). After completing all the necessary procedures, an end user will log out of the system of the invention, which will then note that the user has been logged out (not shown).

As illustrated in FIGS. 18 and 19, when the company coordinating a multi-claimant proceeding sets up a specific case file relating to a class action lawsuit, an internal user will begin a new project. Information relating to the class action lawsuit is entered into the internal database. This information can include, but is not limited to, the court, the case number, the lead plaintiff, the plaintiff and defense counsels, court documents, the judge, important case dates, and any settlement or judgment information.

FIGS. 20A-20H illustrate a sample database record for the system and method of the invention. Included are data collection records, factsheet data records, staging tables on a scheduler for data collection, initialization tables on a scheduler for data collection, final transfer tables on a scheduler for data collection, and tables used in a web portal.

The foregoing description and drawings merely explain and illustrate the invention and the invention is not limited thereto. While the specification in this invention is described in relation to certain implementation or embodiments, many details are set forth for the purpose of illustration. Thus, the foregoing merely illustrates the principles of the invention. For example, the invention may have other specific forms without departing from its spirit or essential characteristic. The described arrangements are illustrative and not restrictive. To those skilled in the art, the invention is susceptible to additional implementations or embodiments and certain of these details described in this application may be varied considerably without departing from the basic principles of the invention. It will thus be appreciated that those skilled in the art will be able to devise various arrangements, which, although not explicitly described or shown herein, embody the principles of the invention and, thus, are within its scope and spirit.

What is claimed is:

1. A method for filing and monitoring electronic claim submissions via a computer server in a multi-claimant proceeding comprising:
   providing a graphical user interface on the computer server for access by an end user via the Internet;
   registering an institution on the computer server to create an institutional database record, wherein the institution is validated prior to accepting registration of an end user on the computer server;
   provisionally registering the end user associated with the registered institution on the computer server to create an end user profile;
   receiving information from the end user regarding a claimant via the graphical user interface and storing the information regarding the claimant on a database associated with the computer server, wherein the end user is not a claimant; and
   storing files supporting a claim directly from a registered end user into the database associated with the computer server.

2. The method of claim 1, wherein the institutional database record includes an institutional contact, further comprising transmitting information identifying the provisionally registered end user to the institutional contact.

3. The method of claim 2, further comprising providing links to the institutional contact that indicate acceptance or rejection of the provisionally registered end user.

4. The method of claim 3, further comprising options selected from the group of deleting the claim, holding the claim or accepting the claim if the end user is rejected.

5. The method of claim 1, wherein each of the files are associated by the computer server with respective pointers allowing each of the files to be uploaded to the computer server.

6. The method of claim 5, wherein the computer server includes a transient server located between a first and a second firewall, further comprising uploading the files to the transient server, storing the uploaded files on the transient database, scanning the uploaded files for malicious code prior to uploading to an internal server through the second firewall, and storing the uploaded files on an internal database.

7. The method of claim 1, further comprising allowing the registered end user to monitor the status of the at least one claim.

8. The method of claim 7, wherein the institutional contact can monitor the status of the at least one claim filed by the registered end user and the status of at least one claim filed by other registered end users.

9. The method of claim 1, further comprising the computer server transmitting messages to the registered end user, if a claim is deficient.

10. The method of claim 9, further comprising providing a link to complete the claim.

11. The method of claim 10, further comprising transmitting a message to the institutional contact if the claim is not completed within a predetermined time period.

12. The method of claim 1, further comprising automatically transmitting a message containing the institutional database record to one or more predesignated individuals for review.

13. The method of claim 12, wherein the message contains links indicating acceptance or rejection of the institution.

14. The method of claim 13, further comprising providing notice to the one or more predesignated individuals that the institutional database record has been reviewed.

15. The method of claim 14, further comprising notifying the institution of acceptance or rejection.

16. The method of claim 1, wherein the institution files claims in two or more litigations and wherein the institution manages claims for multiple claimants.

17. The method of claim 16, wherein the claims are based upon multiple transactions within at least one of the two or more lawsuit resolutions.

18. A system for filing and monitoring electronic claim submissions via a computer server in a multi-claimant proceeding comprising:
   a computer server hosting a graphical user interface directed to end user terminals across the Internet for displaying information about a multi-claimant proceeding and facilitating inputting of information regarding institutions, end users and claimants in a multi-claimant proceeding, and facilitating uploading of files from the end user terminals, wherein the end users input the information regarding institutions, end users, and claimants and wherein the end users are not claimants;
   a first database operably connected to the graphical user interface hosted by the computer server;

code located on the computer server for associating pointers with files supporting at least one claim residing on the end user terminals; and anti-virus code located on the computer server for scanning the files for malicious code by following the respective pointers allowing each of the files to be scanned by the anti-virus software for malicious code after being uploaded to the computer server;

code located on the computer server to validate a registering institution and institutional contact prior to accepting registration from an end user;

and code located on the computer server for transmitting information identifying a provisionally registered end user to the institutional contact.

19. The system of claim 18, wherein the computer server includes a transient server operably connected to a transient database, both located between a first and a second firewall, and an internal server operably connected to an internal database behind the second firewall.

20. The system of claim 19, wherein the anti-virus code scans the files while they reside on the transient database, further comprising code for sweeping scanned files from the transient database operably through the second firewall to the internal database.

21. The system of claim 18, further comprising code for transmitting information identifying a registering end user to the institutional contact.

22. The system of claim 21, further comprising code to provide links to the institutional contact that indicate acceptance or rejection of the registering end user.

23. The system of claim 22, further comprising code to provide options selected from deleting the claim, holding the claim, or accepting the claim to the institutional contact.

24. The system of claim 18, further comprising code allowing a registered end user to monitor the status of at least one claim.

25. The system of claim 24, further comprising code allowing the institutional contact to monitor the status of at least one claim.

26. The system of claim 18, further comprising a second graphical user interface directed to internal user terminals.

27. The system of claim 26, further comprising code that facilitates sending messages relating to deficient claims.

28. The system of claim 18, further comprising code that facilitates sending messages relating to deficient claims.

29. The system of claim 28, further comprising code that facilitates completing a claim.

30. The system of claim 29, further comprising code for transmitting a message to the institutional contact if a claim is not completed within a predetermined time period.

31. The system of claim 18, further comprising code for automatically transmitting a message containing the institutional database record to one or more predesignated individuals for review.

32. The system of claim 31, further comprising code providing links indicating acceptance or rejection of the institution.

33. The system of claim 32, further comprising code for providing notice to the one or more predesignated individuals that the institutional database record has been reviewed.

34. The system of claim 33, further comprising code for notifying the institution of acceptance or rejection.

35. The system of claim 18, wherein the at least one claim is based upon multiple transactions.

36. A method for filing and monitoring electronic claim submissions via a computer server in a multi-claimant proceeding comprising:

providing a graphical user interface on the computer server for access by an end user via the Internet;

registering an institution on the computer server to create an institutional database record;

provisionally registering an end user associated with a validated institution on the computer server to create an end user profile;

receiving information from the end user regarding a claimant via the graphical user interface and storing the information regarding the claimant on a database associated with the computer server, wherein the end user is not a claimant;

storing files supporting the claim directly from a provisionally registered end user into the database associated with the computer server;

providing links to an institutional contact associated with the validated institution that indicate acceptance or rejection of the provisionally registered end user; and providing options selected from the group of deleting a claim, holding the claim, or accepting the claim, if the end user is rejected.

\* \* \* \* \*